(12) United States Patent
Kato

(10) Patent No.: US 8,253,957 B2
(45) Date of Patent: Aug. 28, 2012

(54) PRINTING DATA GENERATING APPARATUS, METHOD, AND PROGRAM FOR REISSUING RESTRICTION TICKET ACCORDING TO TERM OF VALIDITY AND TERM OF REISSUE

(75) Inventor: Kazunori Kato, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1142 days.

(21) Appl. No.: 11/752,814

(22) Filed: May 23, 2007

(65) Prior Publication Data

US 2007/0283155 A1 Dec. 6, 2007

(30) Foreign Application Priority Data

May 30, 2006 (JP) ................................. 2006-150366

(51) Int. Cl.
G06F 3/12 (2006.01)
H04L 9/32 (2006.01)
(52) U.S. Cl. ........ 358/1.15; 713/168; 713/171; 713/176
(58) Field of Classification Search .................... None
See application file for complete search history.

(56) References Cited

U.S. PATENT DOCUMENTS

| 2002/0023208 A1* | 2/2002 | Jancula .......................... 713/156 |
| 2002/0097431 A1* | 7/2002 | Ikegami ....................... 358/1.15 |
| 2005/0066163 A1 | 3/2005 | Ikenoya |
| 2005/0076244 A1* | 4/2005 | Watanabe ..................... 713/201 |
| 2006/0126140 A1* | 6/2006 | Kil et al. ........................ 358/537 |
| 2006/0268315 A1* | 11/2006 | Randt .......................... 358/1.15 |

FOREIGN PATENT DOCUMENTS

| JP | 2003-150336 A | 5/2003 |
| JP | 2005-064770 A | 3/2005 |

* cited by examiner

*Primary Examiner* — Fan Zhang
(74) *Attorney, Agent, or Firm* — Canon USA, Inc., IP Division

(57) ABSTRACT

A print control data generating apparatus generates first print control data and outputs the generated first print control data. The first print control data includes print control data capable of controlling an output of a print job, and includes a term of validity for the print control data. The print control data generating apparatus determines whether the term of validity for the first print control data is unexpired. The print control data generating apparatus generates second print control data based on the first print control data, when the term of validity for the first print control data has expired and if a reissue of the first print control data is requested, and outputs the generated second print control data.

19 Claims, 20 Drawing Sheets

| USER NAME | MAXIMUM NUMBER OF PRINTS | NUMBER OF PRINTS MADE | PRINT APPEARANCE | |
|---|---|---|---|---|
| User1 | 500 | 123 | TWO-SIDED/ ONE-SIDED | 611 |
| User2 | 1000 | 515 | TWO-SIDED | 612 |
| User3 | 2000 | 1021 | TWO-SIDED | 613 |

FIG.7

| Byte \ Bit | 7 | 6 | 5 | 4 | 3 | 2 | 1 | 0 |
|---|---|---|---|---|---|---|---|---|
| 0 | \multicolumn{8}{c|}{OPERATION CODE} | | | | | | | |
| 1 | | | | | | | | |
| 2 | \multicolumn{8}{c|}{BLOCK NUMBER} | | | | | | | |
| 3 | | | | | | | | |
| 4 | \multicolumn{8}{c|}{PARAMETER LENGTH} | | | | | | | |
| 5 | | | | | | | | |
| 6~ | \multicolumn{8}{c|}{DATA} | | | | | | | |

FIG.10

MAX_PRINT=100 ←—901
STRICT_DUPLEX=TRUE ←—902
OUTPUT_PRINTER=printerA ←—903
TERM_OF_VALIDITY=2005/11/05-10:00 ←—904
TERM_OF_REISSUE=2005/11/07-10:00 ←—905
USERNAME=KATO ←—906

FIG.11

| Byte \ Bit | 7 | 6 | 5 | 4 | 3 | 2 | 1 | 0 |
|---|---|---|---|---|---|---|---|---|
| 0 | OPERATION CODE INDICATING OUTPUT RESTRICTION INFORMATION (=0x0301) ||||||||
| 1 | ||||||||
| 2 | BLOCK NUMBER ||||||||
| 3 | ||||||||
| 4 | PARAMETER LENGTH ||||||||
| 5 | ||||||||
| 6~ | OUTPUT RESTRICTION INFORMATION —1201 |||||||  |
|    | | | | | | | | NULL |
|    | SIGNATURE (128th byte) —1202 ||||||||

FIG.12

| Byte \ Bit | 7 | 6 | 5 | 4 | 3 | 2 | 1 | 0 |
|---|---|---|---|---|---|---|---|---|
| 0 | \multicolumn{8}{c}{OPERATION CODE INDICATING DATA} | | | | | | | |
| 1 | INTEGRITY INFORMATION (=0x0302) | | | | | | | |
| 2 | BLOCK NUMBER | | | | | | | |
| 3 | | | | | | | | |
| 4 | PARAMETER LENGTH | | | | | | | |
| 5 | | | | | | | | |
| 6~ | SIGNATURE (128th byte) | | | | | | | |

| Byte \ Bit | 7 | 6 | 5 | 4 | 3 | 2 | 1 | 0 |
|---|---|---|---|---|---|---|---|---|
| 0 | \multicolumn{8}{c|}{OPERATION CODE INDICATING START OF ATTRIBUTE REWRITING (=0x0303)} ||||||||
| 1 | ||||||||
| 2 | \multicolumn{8}{c|}{BLOCK NUMBER} ||||||||
| 3 | ||||||||
| 4 | \multicolumn{8}{c|}{PARAMETER LENGTH} ||||||||
| 5 | ||||||||

FIG.18

| Byte \ Bit | 7 | 6 | 5 | 4 | 3 | 2 | 1 | 0 |
|---|---|---|---|---|---|---|---|---|
| 0 | OPERATION CODE INDICATING TERMINATION OF ATTRIBUTE REWRITING (=0x0304) | | | | | | | |
| 1 | | | | | | | | |
| 2 | BLOCK NUMBER | | | | | | | |
| 3 | | | | | | | | |
| 4 | PARAMETER LENGTH | | | | | | | |
| 5 | | | | | | | | |
| 6~ | SIGNATURE (128th byte) | | | | | | | |

~2501

| USER NAME | PASSWORD | MAXIMUM NUMBER OF PRINTS | NUMBER OF PRINTS MADE | |
|---|---|---|---|---|
| User1 | Akd5sj4f | 500 | 123 | ~211 |
| User2 | SaFjf98w | 1000 | 515 | ~212 |
| User3 | vGks9jgla | 2000 | 1021 | ~213 |

Columns: 201, 202, 203, 204

301

THE ALLOWABLE NUMBER OF PRINTS REMAINING IN THIS MONTH IS 377.
THIS JOB REQUIRES 400 SHEETS IN TOTAL.
PRINT PROCESSING MAY BE INCOMPLETE.
DO YOU CONTINUE?

302  YES    303  CANCEL

PRINTING DATA GENERATING APPARATUS, METHOD, AND PROGRAM FOR REISSUING RESTRICTION TICKET ACCORDING TO TERM OF VALIDITY AND TERM OF REISSUE

BACKGROUND OF THE INVENTION

1. Field of the Invention

The present invention relates to a print control data generating apparatus, a print management apparatus, and a printing apparatus. More specifically, the present invention relates to a technique capable of restricting an output of a print job.

2. Description of the Related Art

In a conventional printing system, a host computer generates image data and a printing apparatus receives the image data via a network from the host computer. The printing apparatus prints an image on a sheet based on the received image data.

In this kind of printing system, reduction in a total cost of ownership (TCO) is the key to realize effective cost reduction in an office environment or preservation of a global environment. The TCO in a printing system includes initial costs for printing devices or the system as well as the costs for various supplies including printing sheets and toners or other coloring agents.

In a network printing system, each user of a client terminal or device accessible to a network can freely use a printing apparatus provided for common use in an office. Accordingly, no one is restricted from using the printing apparatus. The printing result of each user is not checked. Thus, a user may excessively perform printing because of easiness in using the printing apparatus. Thus, the printing costs in an office increase greatly.

To solve the problem, as a first method, a printing system can restrict printing of each user based on address information such as IP address according to the TCP/IP technology. Furthermore, as a second method, a printing system can manage a total number of prints based on an obtained log. However, according to the first method, the print restriction is applied to a host computer identified by a specific IP address. Thus, the first method cannot precisely restrict an output (printed sheets) for each user.

On the other hand, the second method can precisely manage the output (printed sheets) for each user with reference to the log recording the print result. However, an administrator of this system is required to constantly monitor the log to check any unauthorized printing. Accordingly, the second method requires a great amount of human costs and cannot reduce the TCO.

To solve the above-described problems, as discussed in Japanese Patent Application Laid-Open No. 2003-150336, a printing system can restrict an output of each user. The printing system discussed in Japanese Patent Application Laid-Open No. 2003-150336 includes a server, clients, and printers. The server collects printing results from the printers. The server manages a printable sheet number for each user based on the collected printing result. A user of each client can log in to the server. The client obtains, from the server, a printable sheet number being set for a user having issued a job. The client issues a job including the printable sheet number to the printer. The printer performs print processing based on the restriction of the job.

Furthermore, as discussed in Japanese Patent Application Laid-Open No. 2005-64770, a host computer can obtain an authentication ticket from an authentication apparatus. The authentication ticket assures the right to use an external apparatus. This system requires the host computer to transmit an authentication ticket to each external apparatus when the host computer uses a service of the external apparatus.

According to the system discussed in Japanese Patent Application Laid-Open No. 2005-64770, the host computer transfers authentication information (e.g., user ID and password) to the authentication apparatus and obtains a master ticket indicating authentication for a user. The host computer stores the authentication information (e.g., user ID and password) together with the obtained master ticket. Subsequently, the host computer obtains an authentication ticket from the authentication apparatus based on the master ticket. The host computer transfers the authentication ticket to an external apparatus and uses an available service of the external apparatus based on the authentication ticket.

A term of validity is set for the master ticket. If the term of validity for the master ticket has expired, the host computer transfers the authentication information (user ID, password) stored therein to the authentication apparatus and obtains a new master ticket.

According to the printing system discussed in Japanese Patent Application Laid-Open No. 2003-150336, the host computer requests the authentication server to perform user authentication. If the user authentication is successfully completed, the host computer obtains output restriction information from the authentication server. The host computer restricts print processing for each user based on the obtained output restriction information. However, the printing system discussed in Japanese Patent Application Laid-Open No. 2003-150336 has the following problems.

If the printing apparatus can execute all print jobs based on the output restriction information obtained from the authentication server, no problem may arise. However, the host computer possibly uses a general printer driver if a dedicated printer driver cannot be forcibly used for the host computer. In this case, a print job input to the printing apparatus is free from the user authentication performed by the authentication server. Furthermore, the print job input to the printing apparatus does not include output restriction information that restricts the number of prints. Accordingly, the printing system discussed in Japanese Patent Application Laid-Open No. 2003-150336 cannot restrict an output of the print job as intended if the host computer uses a general printer driver.

The system discussed in Japanese Patent Application Laid-Open No. 2005-64770 enables a user to continuously use an intended service of an external apparatus without any consciousness even after the term of validity for an authentication ticket has expired.

Another conventional system includes a print server that can temporarily store a print job including an authentication ticket and transmit the print job to a printing apparatus. The security level of this system is not high because the user authentication information is stored in the print server.

The system discussed in Japanese Patent Application Laid-Open No. 2005-64770 cannot update the authentication ticket unless the user authentication information is used. Accordingly, the print server cannot request the authentication apparatus to update the authentication ticket. If the term of validity for an authentication ticket has expired, a reissue of the authentication ticket or substitute printing to other printing apparatus cannot be realized.

SUMMARY OF THE INVENTION

Exemplary embodiments of the present invention are directed to a technique capable of appropriately controlling an output of a print job. Furthermore, the present invention is directed to a technique capable of appropriately realizing print restriction in a reissue of print control data for the print restriction of a job.

According to an aspect of the present invention, a print control data generating apparatus includes: a first print control data generation unit configured to generate first print control data that includes print control data capable of controlling an output of a print job and includes a term of validity for the print control data; a first print control data outputting unit configured to output the first print control data generated by the first print control data generation unit; a determination unit configured to determine whether the term of validity for the first print control data is unexpired; a second print control data generation unit configured to generate second print control data based on the first print control data, when the determination unit determines that the term of validity for the first print control data has expired and if a reissue of the first print control data generated by the first print control data outputting unit is requested; and a second print control data outputting unit configured to output the second print control data generated by the second print control data generation unit.

According to another aspect of the present invention, a print management apparatus includes: a first inputting unit configured to input a print job having first print control data including print control data that restricts an output of the print job; a reissue requesting unit configured to request a reissue of print control data corresponding to the first print control data included in the print job input by the first inputting unit; a second inputting unit configured to input second print control data generated in response to the request of the reissue requesting unit; an adding unit configured to add attribute change command information and the second print control data to the print job when the second inputting unit inputs the second print control data, so that the first print control data can be replaced with the second print control data based on the attribute change command information; and an outputting unit configured to output a print job including the attribute change command information and the second print control data added by the adding unit.

According to yet another aspect of the present invention, a printing apparatus includes: an inputting unit configured to input a print job; a reissue determination unit configured to determine whether a print control based on second print control data is feasible if the print job includes first print control data and the second print control data, wherein the first print control data restricts an output of the print job; a printing unit configured to perform a print operation of the print job based on information included in the second print control data if the reissue determination unit determines that the print control based on the second print control data is feasible; and a print canceling unit configured to cancel the print operation of the print job if the reissue determination unit determines that the print control based on the second print control data is not feasible.

According to yet another aspect of the present invention, a method includes: generating first print control data that includes print control data capable of controlling an output of a print job and includes a term of validity for the print control data; outputting the generated first print control data; determining whether the term of validity for the first print control data is unexpired; generating second print control data based on the first print control data, when it is determined that the term of validity for the first print control data has expired and if a reissue of the first print control data is requested; and outputting the generated second print control data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an exemplary structure of a job packet according to an exemplary embodiment of the present invention.

FIG. 10 illustrates an exemplary form of a restriction ticket according to an exemplary embodiment of the present invention.

FIG. 11 illustrates an exemplary arrangement of a job packet including output restriction information according to an exemplary embodiment of the present invention.

FIG. 12 illustrates an exemplary arrangement of a job packet including data integrity information according to an exemplary embodiment of the present invention.

FIG. 17 illustrates an exemplary arrangement of an attribute rewrite start job packet according to an exemplary embodiment of the present invention.

FIG. 18 illustrates an exemplary arrangement of an attribute rewrite termination job packet according to an exemplary embodiment of the present invention.

DETAILED DESCRIPTION OF THE EMBODIMENTS

Figure 1:
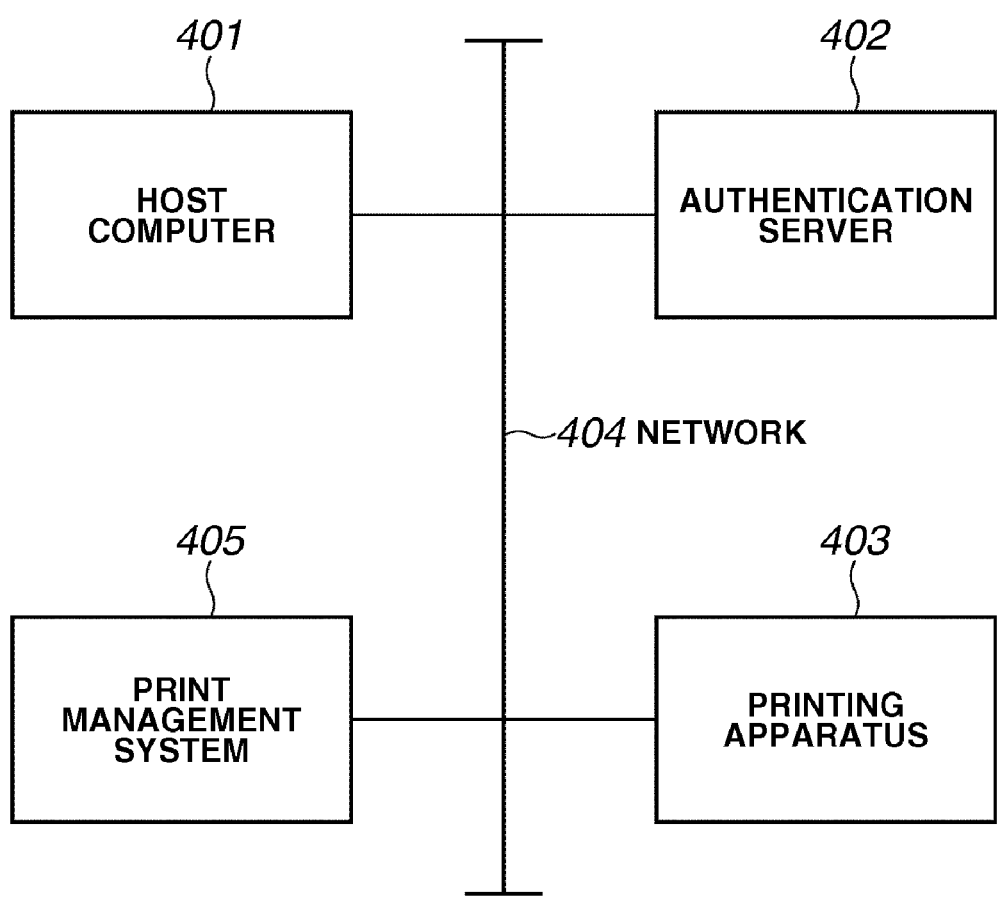
FIG. 1 is a block diagram illustrating an example of a printing system according to an exemplary embodiment of the present invention.

The following description of exemplary embodiments is illustrative in nature and is in no way intended to limit the invention, its application, or uses.

Processes, techniques, apparatus, and systems as known by one of ordinary skill in the art may not be discussed in detail but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is described in one figure, it may not be discussed for following figures.

Exemplary embodiments will be described in detail below with reference to the drawings.

Figure 24:
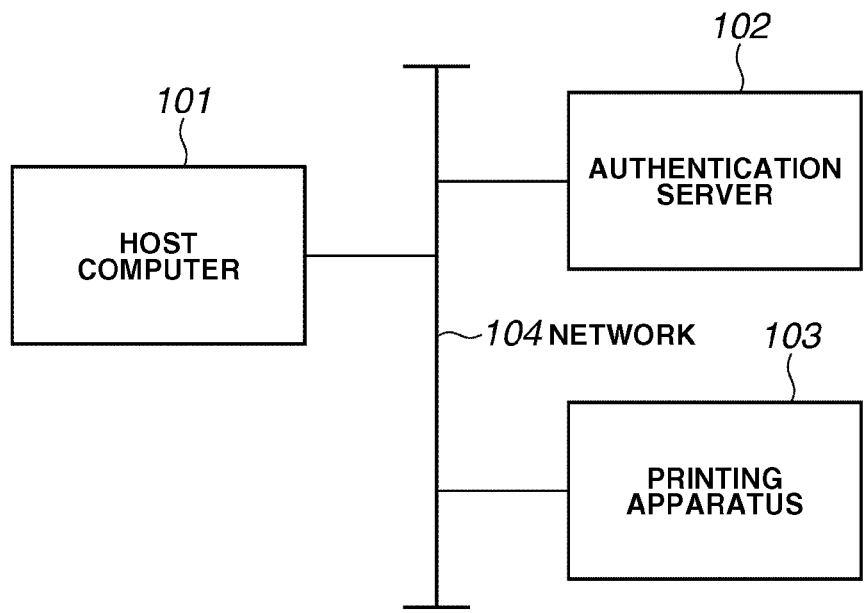
FIG. 24 is a block diagram illustrating a printing system according to an exemplary embodiment of the present invention.

FIG. 24 is a block diagram illustrating a printing system according to an exemplary embodiment of the present invention. The printing system illustrated in FIG. 24 is capable of restricting an output of print processing for each user.

In FIG. 24, a host computer 101 is an information processing apparatus that enables a user to generate image data and transmits the generated image data to a printing apparatus 103 via a network 104. An authentication server 102 is an information processing apparatus capable of storing user authentication information and output restriction information.

The printing apparatus 103 receives print data via the network 104 and prints an image on a sheet based on a well-known print technique, such as an electro-photographic technique or an inkjet technique. The host computer 101, the authentication server 102, and the printing apparatus 103 are mutually connected via the network 104 based on a well-known networking technology including Ethernet.

Figures 25, 26:
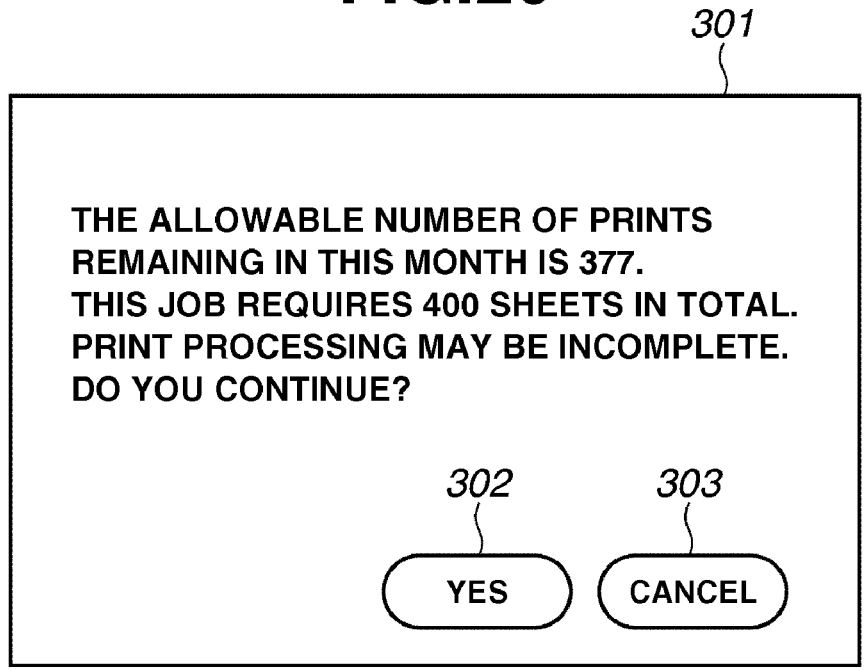
FIG. 25 is a table illustrating a database of the authentication server that stores authentication information of each user and output restriction information according to an exemplary embodiment of the present invention.
FIG. 26 illustrates an exemplary dialog on a warning screen (GUI) according to an exemplary embodiment of the present invention.

FIG. 25 is a table illustrating a database of the authentication server 102 that stores authentication information of each user and output restriction information.

The table illustrated in FIG. 25 includes rows 211 through 213 indicating the entry of each user and columns 201 through 204 describing authentication information of each user and output restriction information. The field 203 indicates a maximum number of prints per month allowed for each user indicated in a user name field 201. The field 204 indicates a number of prints made in this month by the user indicated in the user name field 201.

The value in the number-of-prints-made field 204 can be updated based on information relating to the number of prints actually made by the printing apparatus 103.

The entry 211 is the entry for a user identified by "User1." A character string "Akd5sj4f" in the field 202 is a password assigned to the "User1." The maximum number of prints set for the "User1" is 500. Accordingly, the number of prints allowed for the "User1" in this month is limited to 500. The number of prints made by the "User1" is 123. Therefore, the "User1" has already printed 123 sheets in this month. Similarly, the entry 212 describes the settings for a "User2" and the entry 213 describes the settings for a "User3."

When a user logs into the host computer 101, the user is required to input a user name and a password. The host computer 101 transmits the user name and the password (i.e., authentication information) to the authentication server 102. The authentication server 102 performs user authentication based on a comparison between the user name 201 and the password 202 registered in the database beforehand with the user name and the password transmitted from the host computer 101.

If the user authentication is successfully completed, the authentication server 102 notifies the host computer 101 of set values in the maximum-number-of-prints field 203 and the number-of-prints-made field 204 being set for the authenticated user.

For example, if the authentication server 102 successfully completes the user authentication for the "User1", the host computer 101 receives return values "500" and "123" indicated in the maximum-number-of-prints field 203 and the number-of-prints-made field 204.

Hence, the host computer 101 can recognize an allowable number of prints based on the values returned from the authentication server 102 (i.e., maximum number of prints=500 and number of prints made=123), before the printing apparatus 103 starts print processing of a print job.

If the number of sheets required for a print job designated by a user is equal to or less than the recognized allowable number of prints, the host computer 101 instructs the printing apparatus 103 to execute print processing for the print job. On the other hand, if the number of sheets required for the requested print job is greater than the recognized allowable number of prints, the host computer 101 displays a warning screen to enable a user to select execution of the print job (although the printing result may be incomplete) or cancellation of the print job.

For example, the host computer 101 owned by the "User1" receives the maximum-number-of-prints value (=500) and the number-of-prints-made value (=123) from the authentication server 102, and recognizes an allowable-number-of-prints value equal to 377(500−123).

More specifically, based on the recognized allowable-number-of-prints value (377), the host computer 101 allows the printing apparatus 103 to execute print processing if the number of sheets required for a print job is equal to or less than 377. On the other hand, the host computer 101 displays a warning screen if the number of sheets required for the print job is greater than 377.

For example, if the number of sheets required for the print job is 400, the host computer 101 displays a dialog 301 on a warning screen (GUI) such as the one illustrated in FIG. 26. In FIG. 26, a print execution button 302 enables a user to execute a print job until the number of printed sheets reaches the allowable number of prints. A cancel button 303 enables a user to cancel the print job.

If the print execution button 302 is pressed by a user, the host computer 101 instructs the printing apparatus 103 to execute print processing based on the number of printable sheets for the print job which has been reduced to 377. In this case, the print job for the remaining 23 sheets is incomplete. Thus, a printing result by the printing apparatus 103 may be dissatisfactory for a user. On the other hand, if the cancel button 303 is pressed by a user, the host computer 101 cancels the print request itself.

Hereinafter, an exemplary embodiment capable of improving the above-described technique is described. FIG. 1 is a block diagram illustrating an example of a printing system according to an exemplary embodiment of the present invention. Although the exemplary printing system illustrated in FIG. 1 includes only one host computer 401 and only one printing apparatus 403, the printing system according to the present embodiment may include plural host computers and plural printing apparatuses.

Furthermore, the exemplary printing system illustrated in FIG. 1 includes only one authentication server 402 that can generate print control data and only one print management system 405 that can manage print processing. However, the printing system according to the present embodiment may include plural authentication servers and plural print management systems.

In FIG. 1, the host computer 401 is an information processing apparatus that enables a user to generate a print job and transmits a generated print job to the print management system 405 via a network 404. The authentication server 402 is an information processing apparatus capable of storing user authentication information and output restriction information. The printing apparatus 403 receives a print job via the network 404 and performs a printing operation on a sheet based on a well-known print technique, such as an electrophotographic technique or an inkjet technique.

The print management system 405 is an information processing apparatus that receives a print job generated by the host computer 401 and transmits the received print job to the printing apparatus 403. For example, the print management system 405 monitors the printing apparatus 403 when the printing apparatus 403 performs print processing based on a print job.

More specifically, the print management system 405 has the following functions (a) through (d).

(a) The print management system 405 can instruct another printing apparatus (not illustrated) to execute substitute printing for a malfunctioned printing apparatus 403 if any error occurs in the printing apparatus 403. For example, the print management system 405 can register beforehand a printing apparatus that can perform the substitute printing.

(b) The print management system 405 can cause plural printing apparatuses to cooperatively perform a single print job in a distributed manner.

(c) The print management system 405 can reserve a print job and cause a printing apparatus to automatically start print processing for the reserved print job at a predetermined time (e.g., at a night time).

(d) The print management system 405 can reserve a print job and cause a designated printing apparatus to perform a printing operation in response to a user's print start operation. In this case, a user can instruct start of printing on an operation panel of a printing apparatus (i.e., an output destination). Alternatively, a user can instruct start of printing on the host computer 401 when an application runs for a print start operation. The host computer 401 can inform the print management system 405 of user's print start operation.

As illustrated in FIG. 1, the host computer 401, the authentication server 402, the printing apparatus 403, and the print management system 405 are mutually connected via the network 404 based on a well-known networking technology such as Ethernet.

According to the exemplary arrangement illustrated in FIG. 1, the print management system 405 is an independent information processing apparatus connected to the network 404. However, the functions of the print management system 405 can be realized by at least part of the host computer 401, the authentication server 402, and the printing apparatus 403. Namely, at least one of the host computer 401, the authentication server 402, and the printing apparatus 403 can include appropriate functions comparable to the print management system 405.

Figure 2:
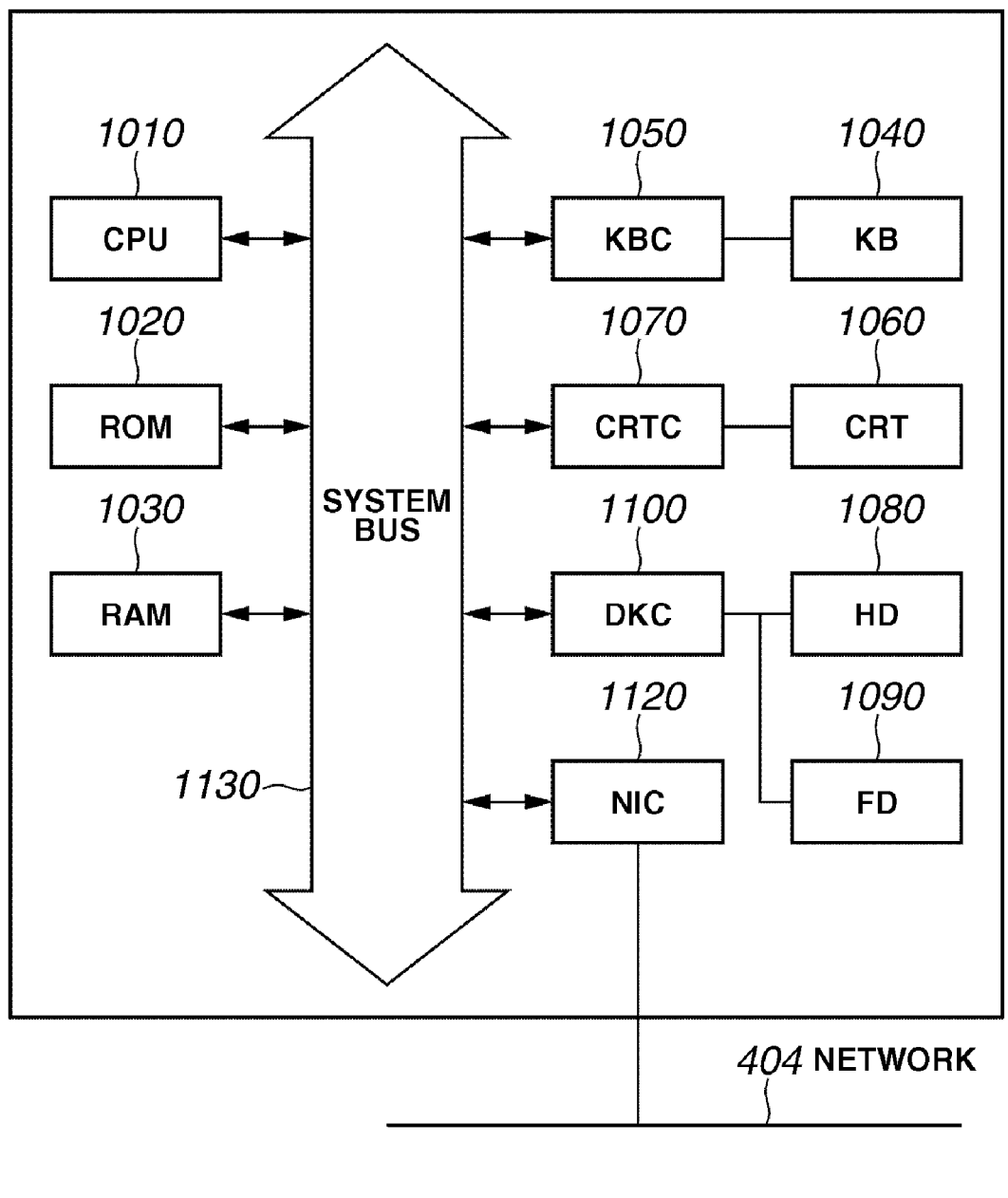
FIG. 2 is a block diagram illustrating an exemplary hardware arrangement for a host computer, an authentication server, and a print management system according to an exemplary embodiment of the present invention.

FIG. 2 is a block diagram illustrating an exemplary hardware arrangement of the host computer 401, the authentication server 402, and the print management system 405. As illustrated in FIG. 2, a central processing unit (CPU) 1010, a read-only memory (ROM) 1020, a random access memory (RAM) 1030, and a keyboard controller (KBC) 1050 of a keyboard (KB) 1040 are connected to a system bus 1130.

A CRT controller (CRTC) 1070 for a CRT display (CRT) 1060, serving as a display section, is connected to the system bus 1130. A disk controller (DKC) 1100 for a hard disk (HD) 1080 and a flexible disk (FD) 1090 is connected to the system bus 1130. Furthermore, a network interface controller (NIC) 1120 is connected to the system bus 1130. The NIC 1120 is a networking device connected to network 404.

The CPU 1010 executes software program(s) stored in the ROM 1020 or the HD 1080 or supplied from the FD 1090 to realize an integrated control for various sections connected to the system bus 1130. Namely, the CPU 1010 reads processing program(s) from the ROM 1020, the HD 1080, or the FD 1090 and executes the program(s) to realize later-described operations according to a predetermined processing sequence.

The RAM 1030 is capable of functioning as a main memory or a work area for the CPU 1010. The KBC 1050 can control a user's instruction input from the KB 1040 or a pointing device (not illustrated).

The CRTC 1070 controls a CRT 1060 that displays an image. The DKC 1100 controls any access to the HD 1080 and the FD 1090 that store a boot program, various applications, edit files, user files, network management program(s), and predetermined processing program(s) according to the present embodiment. The NIC 1120 can realize bidirectional transmission/reception of data to/from other apparatus or system connected to the network 404.

Figure 3:
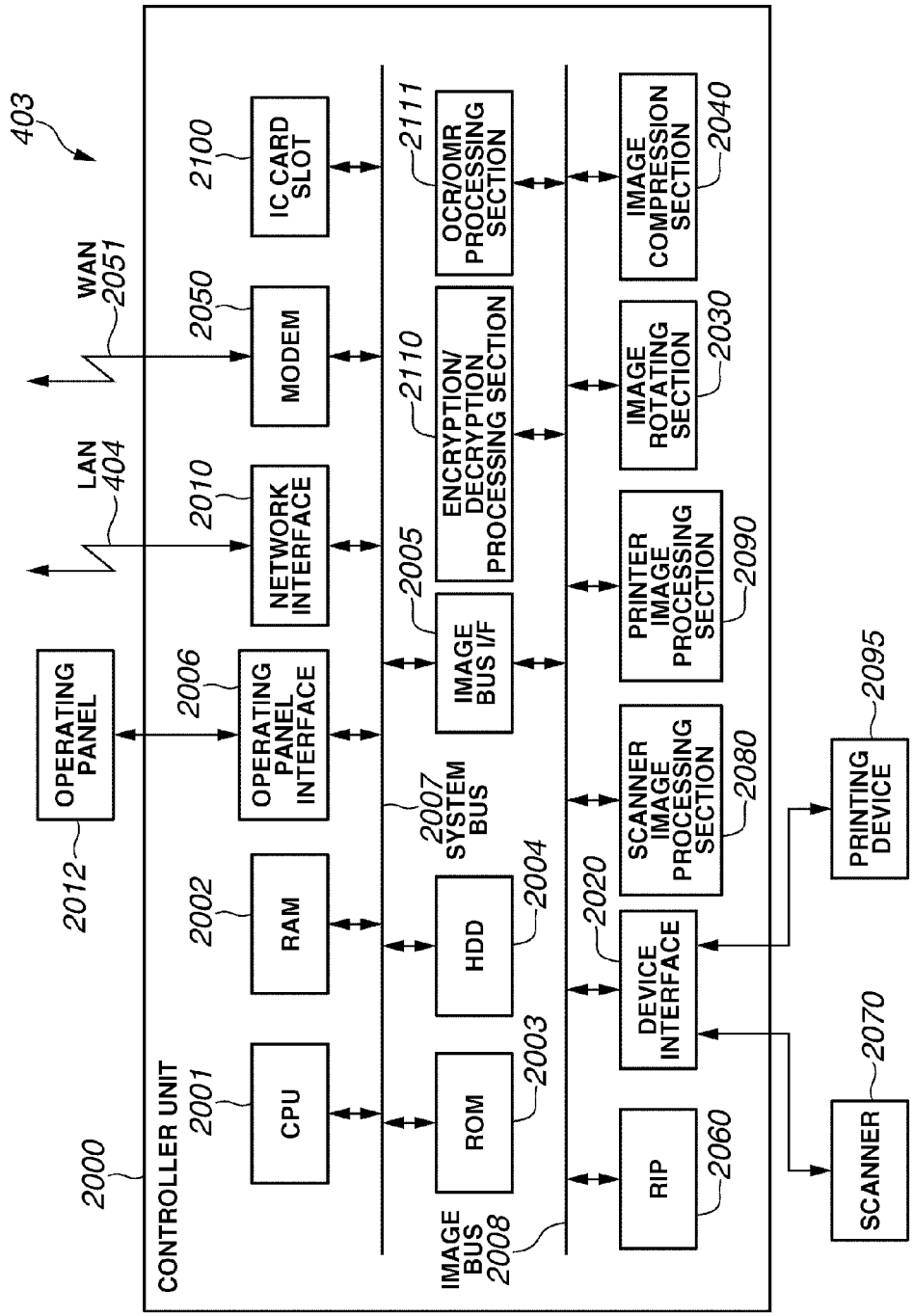
FIG. 3 is a block diagram illustrating an exemplary hardware arrangement for a multifunction peripheral (MFP) (digital all-in-one printer) operable as a printing apparatus according to an exemplary embodiment of the present invention.

FIG. 3 is a block diagram illustrating an example of a hardware arrangement of an MFP (digital all-in-one printer) as an example of the printing apparatus 403. In FIG. 3, a controller unit 2000 is a controller capable of inputting/outputting image information or device information. The controller unit 2000 is connected to a scanner 2070 and a printing device (printer engine) 2095. Furthermore, the controller unit 2000 is connected to a local area network (LAN) 404 and a wide area network (WAN) 2051.

A central processing unit (CPU) 2001 is a controller capable of controlling the system. RAM 2002 is a system work memory for the CPU 2002 and functions as an image memory capable of temporarily storing image data. ROM 2003 is a boot ROM that stores a boot program for the system. HDD 2004 is a hard disk drive capable of storing system software, image data, and historical records (logs).

An operating panel interface 2006 is an interface section for an operating panel (UI; user interface) 2012 having a touch panel. The operating panel interface 2006 outputs image data to the operating panel 2012. The operating panel 2012 displays the received image data. Furthermore, when a user inputs information from the operating panel 2012, the operating panel interface 2006 transmits the input information to the CPU 2001. A network interface 2010, connected to a LAN 404, has an information inputting/outputting function. A modem 2050, connected to a public telephone network 2051, has an information inputting/outputting function.

An IC card slot 2100, when a user inserts an IC card medium, inputs an adequate personal identifier number (PIN) code that is required to input or output a key for encryption/decryption. The above-described devices are mutually connected via a system bus 2007.

An image bus interface 2005, connected between the system bus 2007 and an image bus 2008, functions as a bus bridge capable of converting a data structure. The image bus 2008 is capable of speedily transferring image data. The image bus 2008 is a PCI bus or IEEE1394. The following devices are connected to each other via the image bus 2008.

A raster image processor (RIP) 2060 is capable of rasterizing a page description language (PDL) code to a bitmap image. A device interface 2020 connects the control unit 2000 to the scanner 2070 and the printing device 2095 which function as image input/output devices. The device interface 2020 performs synchronous/asynchronous conversion for the image data.

A scanner image processing section 2080 can apply correction, modification, and edit processing to the input image data. A printer image processing section 2090 applies printer correction or resolution conversion processing to the print output image data. An image rotating section 2030 can rotate image data. An image compressing section 2040 performs JPEG compression/decompression for multi-value image data and performs JBIG, MMR, or MH compression/decompression processing for 2-value image data.

An encryption/decryption processing section 2110 is a hardware accelerator board capable of performing data encryption/decryption processing with a key input from the IC card slot 2100. An OCR/OMR processing section 2111 can read character information or a two-dimensional bar code included in the image data and can generate a character code.

Figure 4:
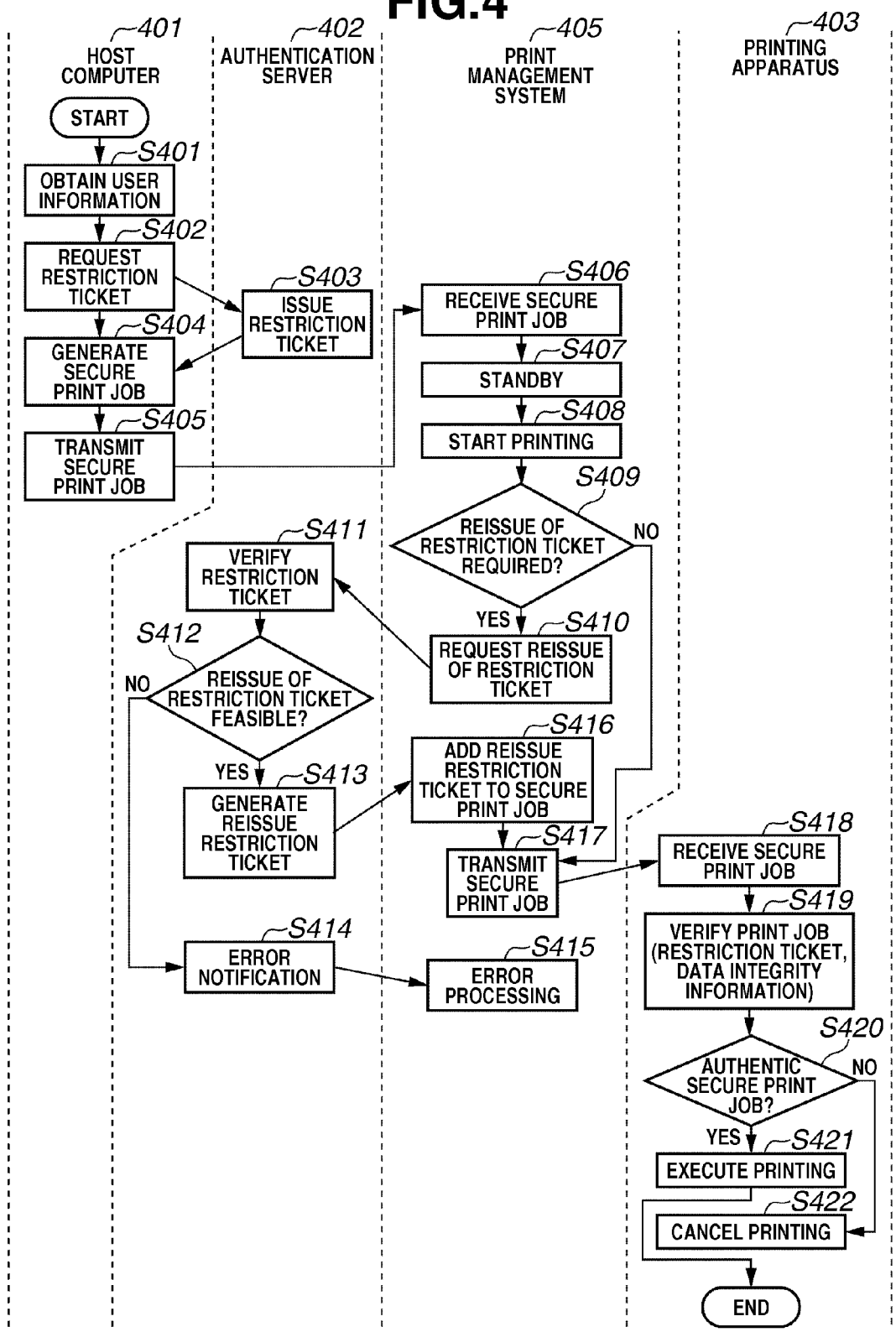
FIG. 4 is a flowchart illustrating an exemplary operation performed by a printing system according to an exemplary embodiment of the present invention.

FIG. 4 is a flowchart illustrating an exemplary operation performed by the printing system according to an exemplary embodiment of the present invention.

First, in step S401, the host computer 401 obtains user information of a user having instructed a print operation. Then, in step S402, the host computer 401 requests the authentication server 402 to transmit a restriction ticket (job ticket). In step S403, the authentication server 402 issues a restriction ticket. The host computer 401 receives the restriction ticket as first print control data from the authentication server 402.

Next, in step S404, the host computer 401 generates a secure print job including the restriction ticket obtained from the authentication server 402 and data integrity information. Then, in step S405, the host computer 401 transmits the generated secure print job to the print management system 405.

In step S406, the print management system 405 receives a secure print job and stores the received secure print job. In step S407, the print management system 405 waits for a print start instruction. In step S408, if a print start instruction is input according to a predetermined method, the print management system 405 starts processing for executing a printing operation.

As an exemplary method, a user can instruct the print management system 405 to start printing. Alternatively, the print management system 405 can automatically start print processing at a designated time. Furthermore, if an error occurs in a printing apparatus during execution of the print processing, the printing apparatus may restart the same printing operation or another printing apparatus may execute the printing. These operations are another exemplary method for instructing start of printing according to the present embodiment. The method for instructing start of printing is not limited to the above-described exemplary methods.

In step S409, the print management system 405 extracts a restriction ticket from the secure print job in response to the print start instruction. Then, the print management system 405 determines whether a term of validity for an extracted restriction ticket has expired. Furthermore, the print management system 405 determines whether a printing apparatus corresponding to an output destination of the secure print job is different from a printing apparatus designated by a user.

If the term of validity for the restriction ticket is unexpired, and if the printing apparatus corresponding to the output destination of the secure print job is identical to the printing apparatus designated by a user (NO in step S409), the processing flow skips steps S410 through S416 and directly proceeds to step S417. Then, the print management system 405 transmits the secure print job to the printing apparatus 403 (refer to step S417).

On the other hand, if the term of validity for the restriction ticket has expired, or if the printing apparatus corresponding to the output destination of the secure print job is different from the printing apparatus designated by a user (YES in step S409), the processing flow proceeds to step S410. Then, in step S410, the print management system 405 transfers the extracted restriction ticket to the authentication server 402 and requests a reissue of the restriction ticket.

In step S411, the authentication server 402 verifies the restriction ticket transferred from the print management system 405. For example, the authentication server 402 determines whether the restriction ticket is the one having been issued by the authentication server 402. And, the authentication server 402 determines whether the term of reissue for the restriction ticket is unexpired. Furthermore, the authentication server 402 determines whether the print management system 405 having requested the reissue is reliable. The authentication server 402 determines whether a user described on the original restriction ticket is present.

More specifically, the authentication server 402 determines that a restriction ticket can be reissued if the following four conditions (i) through (iv) are satisfied. The term of reissue represents a term during which a restriction ticket can be reissued.

(i) The restriction ticket is the one having been issued by the authentication server 402.
(ii) The term of reissue for the restriction ticket is unexpired.
(iii) The print management system 405 having requested the reissue is reliable.

(iv) A user described on the original restriction ticket is present.

If the authentication server 402 determines that a reissue of the restriction ticket is feasible (i.e., YES in step S412), the authentication server 402 generates a reissue restriction ticket as second print control data and transmits the reissue restriction ticket to the print management system 405 (i.e., request source) in step S413. On the other hand, if the authentication server 402 determines that a reissue of the restriction ticket is unfeasible (i.e., NO in step S412), the authentication server 402 transmits an error notification to the print management system 405 in step S414. In step S415, the print management system 405 executes predetermined print error processing.

In response to the reissue restriction ticket generated by the authentication server 402 (step S413), the print management system 405 adds the reissue restriction ticket to the secure print job in step S416. Then, in step S417, the print management system 405 transmits the secure print job to the printing apparatus 403.

The printing apparatus 403 receives the secure print job (refer to step S418), and determines whether the received secure print job is authentic (refer to step S419). More specifically, the printing apparatus 403 verifies the reissue restriction ticket and the original restriction ticket added to the secure print job and further verifies the data integrity information added to the secure print job. If the restriction ticket, the reissue restriction ticket, and the data integrity information are proper, the printing apparatus 403 determines that the received secure print job is authentic (YES in step S420) and processing proceeds to step S421.

In step S421, the printing apparatus 403 performs a printing operation according to output restriction information included in the reissue restriction ticket or in the restriction ticket. On the other hand, if one of the restriction ticket, the reissue restriction ticket, and the data integrity information is not proper, the printing apparatus 403 determines that the received secure print job is unauthentic (NO in step S420) and the printing apparatus 403 cancels the print operation (refer to step S422).

Figures 5, 6:
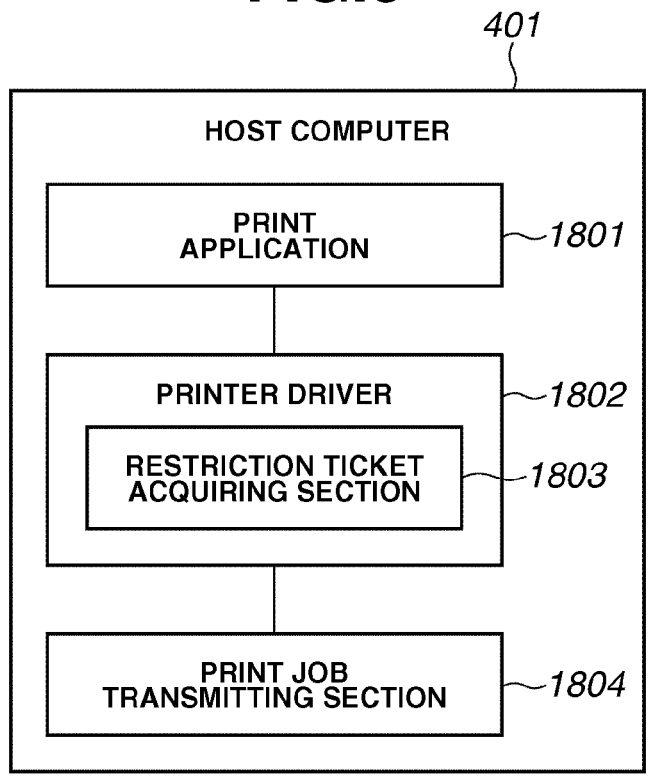
FIG. 5 illustrates exemplary functional blocks of the host computer according to an exemplary embodiment of the present invention.
FIG. 6 illustrates an exemplary database of the authentication server which stores authentication information of each user and output restriction information according to an exemplary embodiment of the present invention.

The processing illustrated in FIG. 4 will be described below in detail. FIG. 5 illustrates exemplary functional blocks of the host computer 401. In FIG. 5, a print application 1801 is application software capable of instructing a print operation and transmitting drawing commands to a printer driver 1802.

The printer driver 1802 receives the drawing commands from the print application 1801 and converts the received drawing commands into page description language (PDL) data or other print data that the printing apparatus 403 can interpret. Then, the printer driver 1802 outputs a secure print job including the print data to a print job transmitting section 1804.

A restriction ticket acquiring section 1803 can operate as an internal module of the printer driver 1802. More specifically, the restriction ticket acquiring section 1803 operates the print application 1801 and obtains authentication information of a user who has instructed a print operation and output destination information (i.e., information relating to a printing apparatus designated as output destination for a print job).

Then, the restriction ticket acquiring section 1803 transfers the user authentication information to the authentication server 402, and obtains a restriction ticket of a corresponding user and signature data of the restriction ticket. The restriction ticket acquiring section 1803 adds the obtained restriction ticket and the signature data to a print job together with data integrity information, and generates a secure print job.

The printer driver 1802 transmits the generated secure print job to the print job transmitting section 1804. The print job transmitting section 1804 receives the secure print job from the printer driver 1802 and transmits the secure print job to the print management system 405.

FIG. 6 illustrates an exemplary database of the authentication server 402 which stores authentication information of each user and output restriction information. The table illustrated in FIG. 6 includes rows 611 through 613 indicating the entry of each user and columns 601 through 604 describing authentication information of each user and output restriction information.

The field 602 indicates a maximum number of prints per month allowed for each user indicated in a user name field 601. In other words, each user can print as much as the maximum number indicated in the field 602 in each month. The field 603 indicates a number of prints made in this month by the user indicated in the user name field 601.

The authentication server 402 receives information relating to the number of actually made prints from the printing apparatus 403 and updates a value in the number-of-prints-made field 603. The field 604 describes a print appearance that can be set by each user indicated in the user name field 601. According to the example illustrated in FIG. 6, the print-appearance field 604 describes two-sided printing (duplex printing) and one-sided printing as selectable print appearance. Alternatively, the print-appearance field 604 may describe color printing, monochrome printing, and other various print appearances.

The entry 611 describes restriction information applied to a user identified by "User1", according to which the "User1" can print 500 sheets in this month as indicated in the maximum-number-of-prints field 602 although the "User1" has already printed 123 sheets as indicated in the number-of-prints-made field 603. Furthermore, the "User1" is allowed to select either the two-sided printing or the one-sided printing as indicated in the print-appearance field 604.

Each user inputs a user name and a password for logging-in the host computer 401. If a user instructs a print operation through the print application 1801, the restriction ticket acquiring section 1803 obtains a user name of a currently logged-on user (i.e., a user having instructed a print operation on the host computer 401). The host computer 401 transmits the user name to the authentication server 402 via the network 404.

The authentication server 402 performs user authentication based on a comparison between the user name input via the network 404 and the user name 601 registered in the database illustrated in FIG. 6. After completing the user authentication, the authentication server 402 generates a restriction ticket and transmits the generated restriction ticket to the host computer 401. For example, if the user authentication for the "User1" is successfully completed, the host computer 401 can obtain a restriction ticket including a printable sheet number equal to 373 (500-123) and two-sided printing/one-sided printing as allowed print appearance 604.

Next, an exemplary print job format will be described. The print job according to the exemplary embodiment includes one or more standardized job packets so that start/end of the print job can be easily recognized and print job attributes can be easily set.

FIG. 7 illustrates an exemplary structure of a job packet according to an exemplary embodiment of the present invention. In FIG. 7, an ordinate axis represents "Byte" and an abscissa axis represents "Bit" of each byte. The job packet illustrated in FIG. 7 includes, in the rows of 0th and 1st bytes, an operation code which represents a function of the packet. The operation code is an identification (ID) having a 2-byte length.

For example, the operation code of a job packet can be any one of the following values.
0x0201; job start operation
0x0202; job attribute setting operation
0x0204; PDL data transmission operation
0x0205; job termination operation
0x0301; restriction information operation
0x0302; data integrity information operation
0x0303; attribute rewrite start operation
0x0304; attribute rewrite termination operation The job packet illustrated in FIG. 7 includes a block number in the rows of 2nd and 3rd bytes. When a transmission side requests a reply of any job packet, a reply from a reception side can include the block number to identify a packet corresponding to the reply request of the transmission side.

For example, after three job packets having block numbers "1", "2", and "3" are successively transmitted in this order, an error packet including the block number "2" may be returned. In this case, the transmission side can determine that any error has occurred in the job packet having the block number "2."

The job packet illustrated in FIG. 7 includes, in the rows of 4th and 5th bytes, a parameter length that represents the byte length of a data area which can be a value in the range from 0 to 64 Kbytes. The job packet further includes, starting at the row of 6th byte, the data area that can store data corresponding to the operation code. When the operation code is the job start operation or the job termination operation, no data is stored in the data area.

When the operation code is the job attribute setting operation, a job attribute ID and a job attribute value are stored in the data area. In the present embodiment, the job attribute ID is an identifier corresponding to an attribute or environment relating to the job and is assigned beforehand as ID corresponding to the attribute of a job regulated according to the ISO-10175(DPA). ISO stands for International Organization for Standardization.

The job attribute ID can be any one of the following values.
0x0101; job name
0x0103; job owner name
0x016a; job size
0x0174; print page number Alternatively, the job attribute ID can be a job attribute and a corresponding ID allocated according to a function of the printing apparatus 403. An exemplary job attribute can be a client print job ID, a number of prints, or print appearance (e.g., monochrome/color or two-sided/one-sided).

Figure 8:
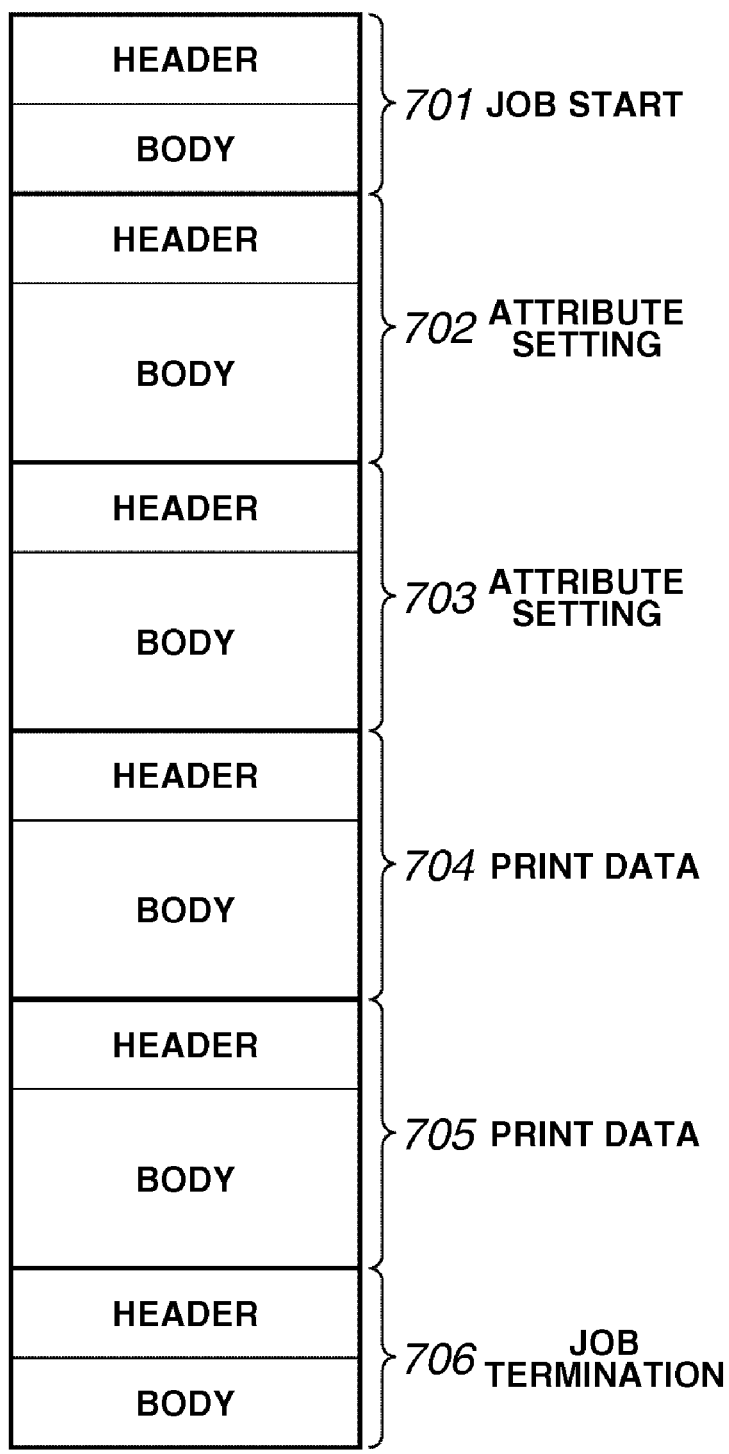
FIG. 8 illustrates an arrangement of a print job according to an exemplary embodiment of the present invention, which includes no output restriction information.

FIG. 8 illustrates a simplified arrangement of a print job which includes no output restriction information. The print job illustrated in FIG. 8 includes plural job packets 701 through 706 which can be transmitted from the host computer 401 to the printing apparatus 403 in this order. Each job packet includes a header portion and a body portion. The header portion corresponds to the fixed area in the rows of 0th through 5th bytes illustrated in FIG. 7. The body portion corresponds to the 6th byte and therafter illustrated in FIG. 7.

The job packet 701, positioned at the head of the print job, is a job packet declaring start of a job. According to the present embodiment, the job packet 701 has an operation code representing a job start operation (0x0201) in the rows of 0th and 1st bytes.

The job packets 702 and 703 are job packets capable of setting attributes such as a job name of a print job, an owner name, a client print job ID, and print conditions. According to the present embodiment, the job packets 702 and 703 have an operation code representing an attribute setting operation (0x0202) in the rows of 0th and 1st bytes. The example illustrated in FIG. 8 includes plural job packets for attribute setting because the attribute setting is performed plural times.

The job packets 704 and 705 are job packets capable of transmitting print data. According to the present embodiment, the job packets 704 and 705 have an operation code representing a PDL data transmission operation (0x0204) in the rows of 0th and 1st bytes. The example illustrated in FIG. 8 includes plural job packets for PDL data transmission because the PDL data transmission is performed plural times.

The job packet 706, positioned at the tail of the print job, declares termination of the print job. According to the present embodiment, the job packet 706 has an operation code representing a job termination operation (0x0205) in the rows of 0th and 1st bytes.

Figure 9:
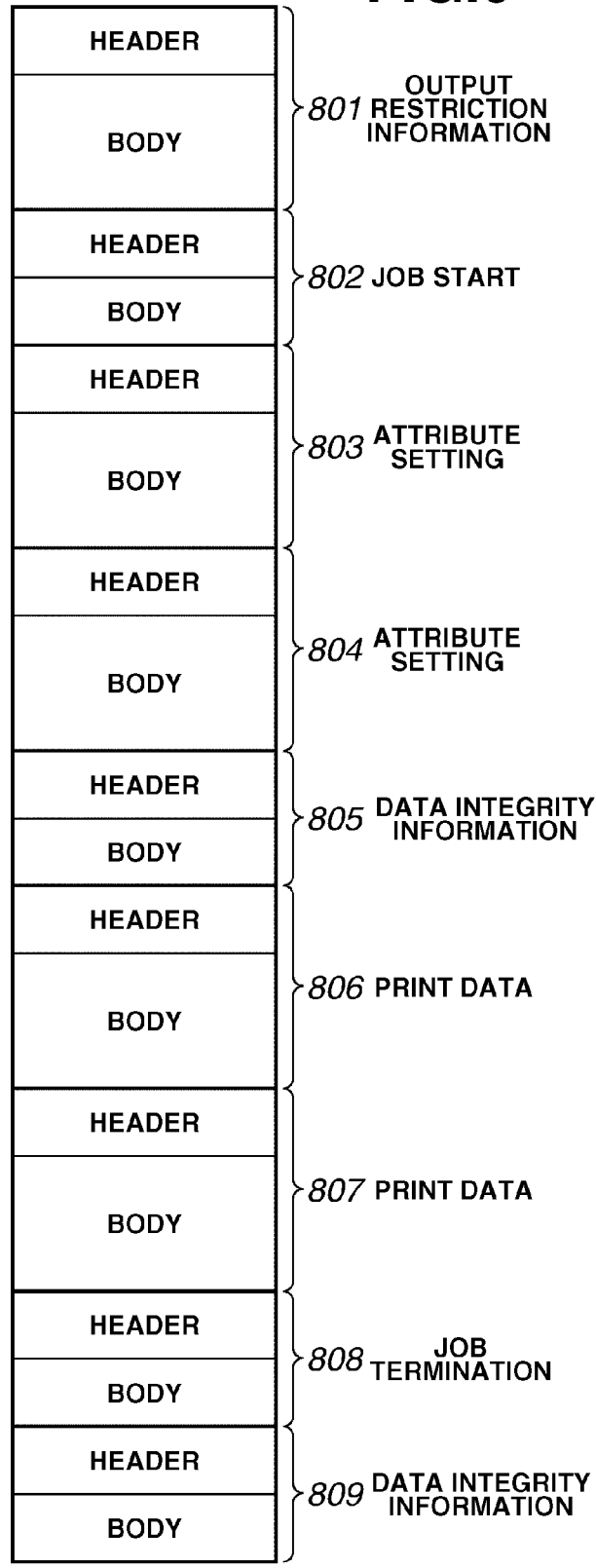
FIG. 9 illustrates a print job arrangement according to an exemplary embodiment of the present invention, which includes output restriction information.

FIG. 9 illustrates a simplified arrangement of a print job which includes output restriction information.

A job packet 801, positioned at the head of the print job illustrated in FIG. 9, is a job packet describing output restriction information. A job packet 805, positioned between an attribute setting job packet 804 and a print data transmission job packet 806, is a job packet describing data integrity information. A job packet 809, positioned at the tail of the print job, is a job packet describing data integrity information.

According to the present embodiment, the job packet 801 has an operation code representing a restriction information operation (0x0301) in the rows of 0th and 1st bytes. The job packet 801 has a data area describing the output restriction information.

According to the present embodiment, the job packets 805 and 809 have an operation code representing a data integrity information operation (0x0302) in the rows of 0th and 1st bytes. The job packets 805 and 809 have a data area describing the data integrity information. The other job packets in the example shown in FIG. 9 (i.e., job start 802, attribute setting 803, 804, print data 806, 807 and job termination 808) are similar to the corresponding job packets 701, 702, 703, 704, 705 and 706 shown in FIG. 8 and described above.

FIG. 10 illustrates an exemplary form of a restriction ticket that includes an upper-limit value of a printable sheet number.

In FIG. 10, a first row 901 includes a character string "MAX_PRINT" representing an upper-limit number of printable sheets allocated to the print job and a numerical value "=100" representing a set value for the upper-limit number. Namely, a printable upper-limit value for the print job illustrated in FIG. 10 is 100 sheets.

A second row 902 describes a form for forcibly executing the two-sided printing in the print job. A third row 903 describes information relating to a printing apparatus which operates as an output destination of the print job. According to the example illustrated in FIG. 10, a printing apparatus "printerA" is an output destination of the print job.

In the following description, the information relating to a printing apparatus operating as an output destination of the print job may be referred to as "output destination printer information." The printing apparatus can disable a print instruction if the printing apparatus is not designated by the output destination printer information.

A fourth row 904 describes a term of validity for the restriction ticket. According to the example illustrated in FIG. 10, the restriction ticket is valid until 10:00 on Nov. 5, 2005. A fifth row 905 describes a term of reissue for the restriction ticket. According to the example illustrated in FIG. 10, the restriction ticket is valid until 10:00 on Nov. 7, 2005.

A sixth row 906 describes information relating to a user who has issued the restriction ticket. The restriction ticket illustrated in FIG. 10 is a mere example. The content restricting an output of a print job is dependent on each restriction ticket and is not limited to the example illustrated in FIG. 10. For example, the content of a restriction ticket may include N-in-1 (or N-up) print information for printing plural images (reduced images) on a single sheet.

The restriction information described in the restriction ticket (e.g., number of prints and print appearance) gives significant effects on an operation of the printing apparatus 403 (later-described print data interpreting section 509). More specifically, if command designation based on the PDL data does not satisfy the content of a restriction ticket, the command designation is invalidated. Thus, an output print result includes a significant influence.

Furthermore, the present embodiment performs verification based on a digital signature to verify whether a restriction ticket has been issued from the proper authentication server 402. The digital signature is an example of signature information.

FIG. 11 illustrates an exemplary arrangement for the job packet 801 that includes output restriction information. In FIG. 11, an ordinate axis represents "Byte" and an abscissa axis represents "Bit" of each byte. The job packet illustrated in FIG. 11 includes a header area in the rows of 0th through 5th bytes and a data area in the row of 6th byte and thereafter. The data area includes an area 1201 ranging from the head to NULL that can store the output restriction information illustrated in FIG. 10.

Furthermore, the data area includes an area 1202 succeeding the NULL and having a capacity equal to 128 bytes that stores a digital signature. The digital signature can assure that the output restriction information has been issued from the reliable authentication server 402 and has not been rewritten by an unauthorized method.

For example, the present embodiment can use the RSA public key cryptosystem as an exemplary digital signature. When the digital signature is based on such a public key system, an issue source (i.e., the authentication server 402) generates a digest based on a unidirectional function from a signature object (i.e., output restriction information) and encrypts the generated digest with its own private key. The printing apparatus 103 verifies the digital signature with the public key.

In this case, the signature information verifying method allows only the reliable authentication server 402 to keep a private key. Properness of the signature object (i.e., output restriction information) can be proved if the verification of the digital signature using a correct public key is successful.

In the present embodiment, the public key for a digital signature is a public key pair stored in the authentication server 402. The authentication server 402 sends the public key pair to the printing apparatus 403 before starting a printing operation.

For example, the public key infrastructure (PKI) is an exemplary certificate by a trusted third party if a public key is transmitted or received via the network 404. Alternatively, a memory card can be used to deliver a public key to a user.

FIG. 12 illustrates an exemplary arrangement of the job packets 805 and 809 including data integrity information. In FIG. 12, an ordinate axis represents "Byte" and an abscissa axis represents "Bit" of each byte. The job packet illustrated in FIG. 12 includes a header area in the rows of 0th through 5th bytes and a data area in the row of 6th byte and thereafter. The data area includes an area 1701 ranging from the head of the data area and having a capacity equal to 128 bytes that can store a digital signature. The digital signature assures that the data integrity information has not been rewritten by an unauthorized method.

First, the present embodiment calculates a digital signature attached to the job packet 801 (i.e., a packet describing output restriction information). The present embodiment calculates a digital signature for the job packet 805 (i.e., a packet describing data integrity information) based on the output restriction information in the packet 801. Furthermore, the present embodiment calculates a digital signature for the job packet 809 (i.e., a packet describing data integrity information) based on the data integrity information in the job packet 805. More specifically, for example, digital signatures for the job packets 805 and 809 (i.e., a packet describing data integrity information) are calculated based on the output restriction information in the packet 801 and the digital signature data of the data integrity information in the job packet 805, respectively.

If any job packet is extracted together with data integrity information, a digital signature for the succeeding data integrity information cannot be accurately calculated. Thus, the above-described arrangement can detect alteration made on the job packets.

Figure 13:
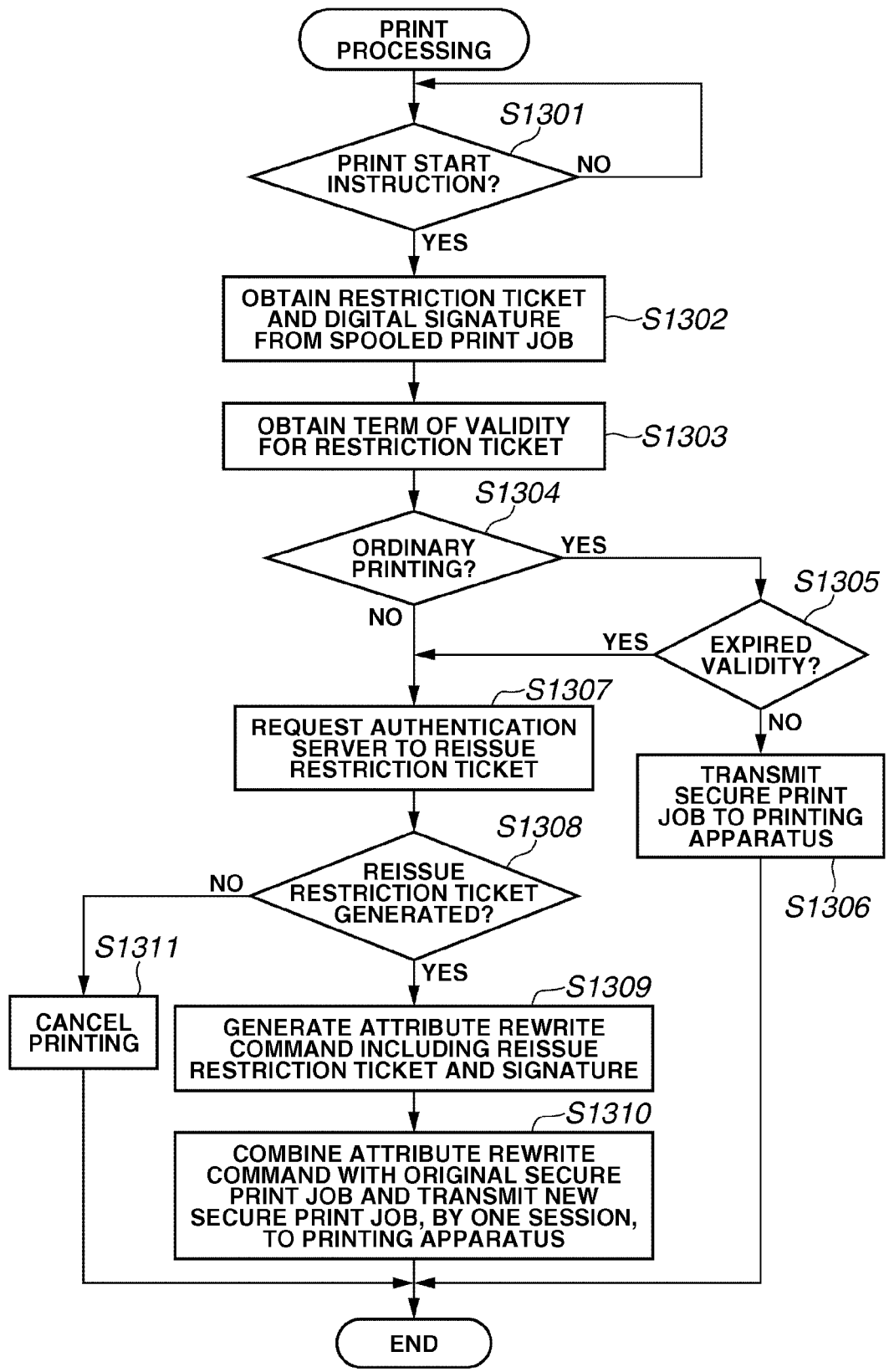
FIG. 13 is a flowchart illustrating an exemplary operation performed by the print management system according to an exemplary embodiment of the present invention, including reception of a print start instruction and transmission of a print job to the printing apparatus.

FIG. 13 is a flowchart illustrating an exemplary operation performed by the print management system 405 including reception of a print start instruction and transmission of a print job to the printing apparatus 403. The print management system 405, as described with reference to FIG. 4, spools and stores a secure print job transmitted from the host computer 401 and waits for a print start instruction (refer to step S1301).

If a print start instruction is input (YES in step S1301), the print management system 405 obtains a restriction ticket from the stored secure print job and a digital signature of the restriction ticket (refer to step S1302), and obtains a term of validity for the restriction ticket (refer to step S1303).

Next, the print management system 405 determines whether the print instruction is an ordinary printing operation (refer to step S1304). If the print management system 405 determines that the print instruction is an ordinary printing operation (YES in step S1304), the processing flow proceeds to step S1305. More specifically, the host computer 401 generates a print job describing the information relating to a printing apparatus designated as an output destination by a user. If the printing apparatus designated by a user performs a printing operation, the processing flow proceeds to step S1305.

On the other hand, if the print management system 405 determines that the instructed print is not ordinary printing (NO in step S1304), the processing flow proceeds to step S1307. For example, the output destination may be a printing apparatus performing substitute printing or plural printing apparatuses performing distributed printing. In such cases, the processing flow proceeds to step S1307.

In step S1305, the print management system 405 determines whether the term of validity for the restriction ticket obtained in step S1303 has expired. If the print management system 405 determines the term of validity for the restriction ticket has not yet expired (NO in step S1305), the processing flow proceeds to step S1306.

In step S1306, the print management system 405 transmits the secure print job to the printing apparatus 403. Then, the print management system 405 terminates the print processing. On the other hand, if the print management system 405 determines the term of validity for the restriction ticket obtained has already expired (YES in step S1305), the processing flow proceeds to step S1307.

If the term of validity for the restriction ticket has expired (YES in step S1305) or if the instructed print is the substitute printing or the distributed printing different from the ordinary printing (NO in step S1304), the print management system 405 requests the authentication server 402 to reissue a restriction ticket (refer to step S1307). To request a reissue of the restriction ticket, the print management system 405 transmits the original restriction ticket, a digital signature for the restriction ticket, a certificate for the print management system 405, and the output destination printer information to the authentication server 402.

Next, in step S1308, the print management system 405 determines whether the authentication server 402 has generated a reissue restriction ticket and a digital signature for the reissue restriction ticket. For example, the print management system 405 can check whether a reissue restriction ticket is returned from the authentication server 402 within a predetermined period of time after the print management system 405 has requested a reissue of the restriction ticket.

If the print management system 405 determines that the authentication server 402 has issued a reissue restriction ticket and a digital signature for the reissue restriction ticket (YES in step S1308), the processing flow proceeds to step S1309. In step S1309, the print management system 405 generates an attribute rewrite command including the reissue restriction ticket and the digital signature for the reissue restriction ticket.

The attribute rewrite command is an example of rewrite command information. The attribute rewrite command can be any other information having a command or script format or can be a specific string of data. Then, the print management system 405 combines the attribute rewrite command with the original secure print job. The print management system 405 transmits a new secure print job including the attribute rewrite command, by one session, to the printing apparatus (refer to step S1310). Processing then ends.

If the print management system 405 determines that the authentication server 402 has not issued the reissue restriction ticket and the digital signature for the reissue restriction ticket, i.e., if the authentication server 402 disables generation of a reissue restriction ticket (NO in step S1308), the processing flow proceeds to step S1311. Then, the print management system 405 performs processing for canceling the print. Processing then ends. When plural printing apparatuses perform cooperative printing processing (e.g., the distributed printing), the print management system 405 repeatedly performs the processing of steps S1307 through S1310 for each of the printing apparatuses.

The authentication server 402 stores the certificate for the print management system 405 which is registered beforehand as a reliable system. If the print management system 405 requests a reissue of the restriction ticket, the authentication server 402 compares the certificate for the print management system 405 with a certificate for a print management system registered beforehand in the authentication server 402. Then, based on a compared result, the authentication server 402 determines whether the print management system 405 having requested a reissue of the restriction ticket is a reliable print management system. The authentication server 402 can obtain a certificate based on a general digital certificate technology using public and private keys.

Figures 14, 15:
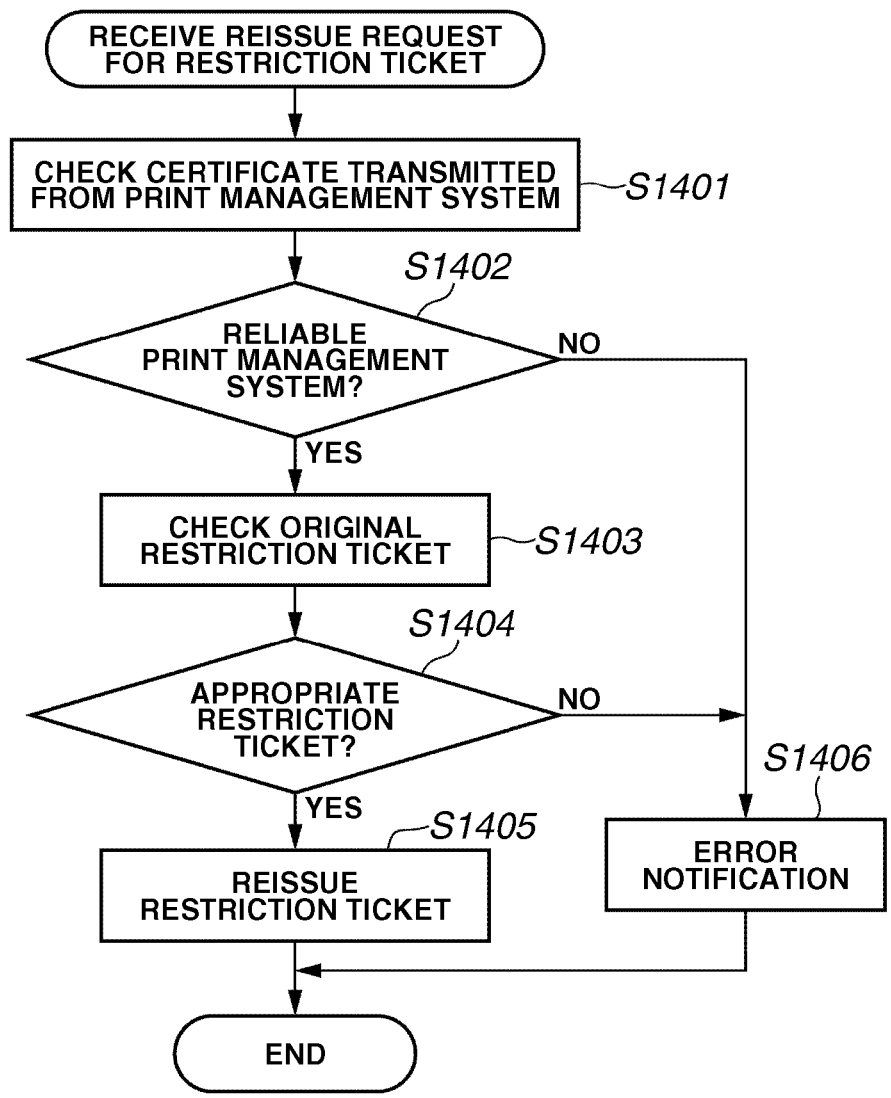
FIG. 14 is a flowchart illustrating an exemplary operation performed by the authentication server that reissues a restriction ticket according to an exemplary embodiment of the present invention.
FIG. 15 illustrates an exemplary form of a reissue restriction ticket according to an exemplary embodiment of the present invention.

FIG. 14 is a flowchart illustrating an exemplary operation performed by the authentication server 402 that reissues a restriction ticket. First, in step S1401, the authentication server 402 confirms a certificate transmitted from the print management system 405 (i.e., the certificate for the print management system 405).

Next, in step S1402, the authentication server 402 determines whether the print management system 405 is a reliable print management system registered beforehand. For example, the authentication server 402 can determine whether the certificate transmitted from the print management system 405 is registered beforehand.

If the authentication server 402 determines that the print management system 405 is not a reliable print management system (NO in step S1402), the processing flow proceeds to step S1406. In step S1406, the authentication server 402 returns an error notification to the print management system 405 (i.e., a request source of a reissue restriction ticket) and processing ends.

On the other hand, if the authentication server 402 determines that the print management system 405 is a reliable print management system (YES in step S1402), the processing flow proceeds to step S1403. In step S1403, the authentication server 402 verifies the original restriction ticket transmitted from the print management system 405 and the digital signature for the restriction ticket. For example, the authentication server 402 performs verification according to the following method.

A first step includes determining whether the original restriction ticket has been issued by the authentication server 402 and verifying, based on the digital signature of the original restriction ticket, whether any alteration is made on the original restriction ticket.

If the original restriction ticket has been issued by the authentication server 402 and no alteration has been made on the restriction ticket, the verifying conditions of the first step can be satisfied.

A second step includes verifying whether a user described in the original restriction ticket is present, based on the digital signature for the original restriction ticket and the database illustrated in FIG. 6. If the user described in the original restriction ticket is present, the verifying conditions of the second step can be satisfied.

A third step includes verifying whether a reissue term for the original restriction ticket has expired. If the reissue term for the original restriction ticket is unexpired, the verifying conditions for the third step can be satisfied.

In step S1404, the authentication server 402 determines whether the verifying conditions of the above-described first to third steps are all satisfied. If any one of the verifying conditions of the first to third steps is not satisfied (NO in step S1404), the processing flow proceeds to step S1406. In step S1406, the authentication server 402 returns an error notification to the print management system 405 (i.e., the request source of a reissue restriction ticket) and processing ends.

On the other hand, if all the verifying conditions of the first to third steps are satisfied and the original restriction ticket is authentic (YES in step S1404), the processing flow proceeds to step S1405. In step S1405, the authentication server 1402 generates a new reissue restriction ticket based on the original restriction ticket and then processing ends.

The reissue restriction ticket includes a term of validity being newly set, the output destination printer information (i.e., printing apparatus information designated by the print management system 405), and the digital signature for the original restriction ticket. In step S1405, the authentication server 402 returns the newly generated reissue restriction ticket to the print management system 405.

FIG. 15 illustrates an exemplary form of a reissue restriction ticket.

In FIG. 15, a first row 1101 includes a character string "MAX_PRINT" the same as the row 901 in a restriction ticket shown in FIG. 10, representing an upper-limit number of printable sheets allocated to the print job and a numerical value "=50" representing a set value for the upper-limit number. Namely, a printable upper-limit value for the print job illustrated in FIG. 15 is 50 sheets.

A second row 1102 describes a form for forcibly executing the two-sided printing in the print job. A third row 1103 describes output destination printer information. According to the example illustrated in FIG. 15, a printing apparatus "printerB" is an output destination of the print job.

A fourth row 1104 describes a term of validity for the reissue restriction ticket. According to the example illustrated in FIG. 10, the restriction ticket is valid until 10:00 on Nov. 6, 2005.

A fifth row 1105 describes information relating to a user (i.e., an issue source of a reissue restriction ticket). A sixth row 1106 describes a digital signature for the original restriction ticket. The digital signature described in the sixth row 1106 can specify an original restriction ticket from which a reissue restriction ticket has been generated.

Figure 16:
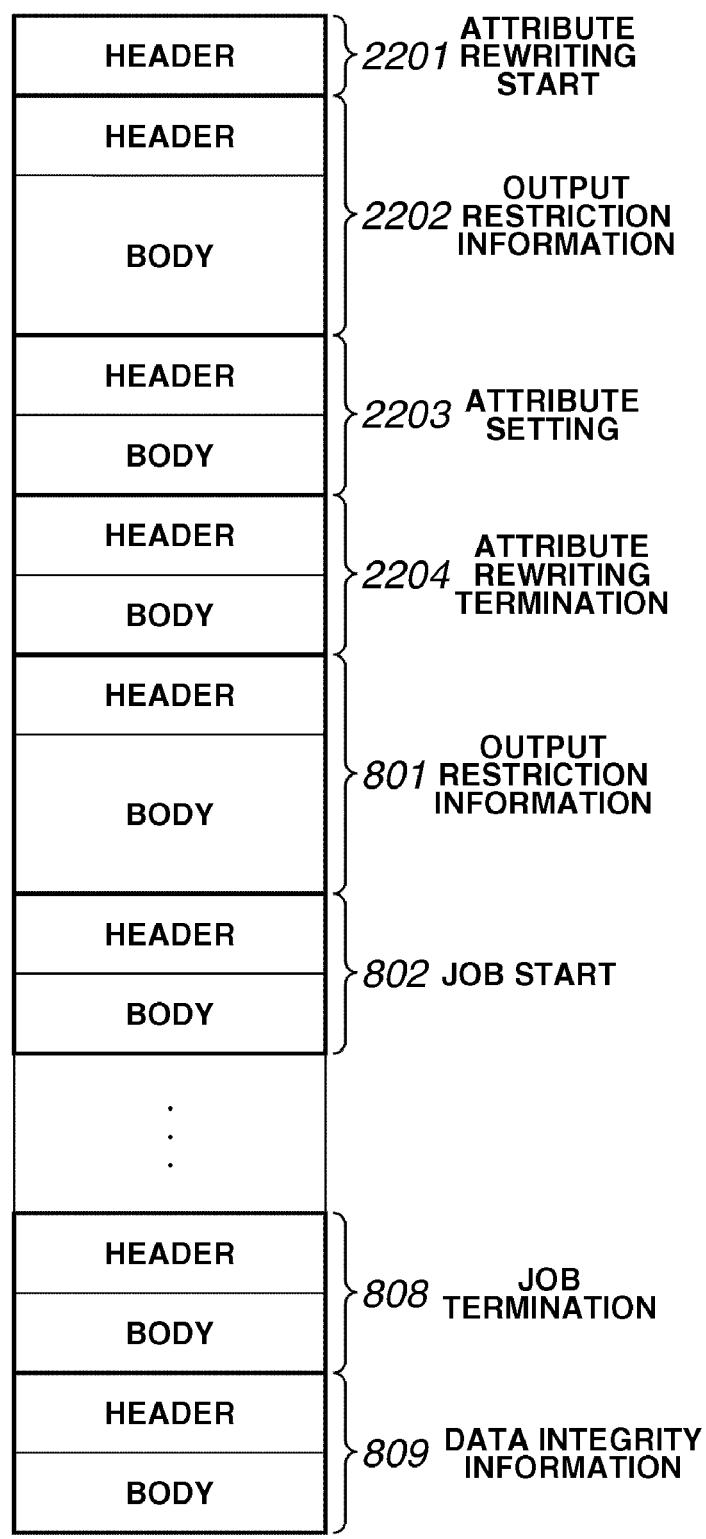
FIG. 16 illustrates an exemplary print job arrangement including an attribute rewrite operation for adding a reissue restriction ticket according to an exemplary embodiment of the present invention.

FIG. 16 illustrates a simplified arrangement of a print job including an attribute rewrite operation for adding a reissue restriction ticket. When the reissue restriction ticket is added to a print job to which the restriction job is added, a job packet 2201 is positioned at the head of the print job and a job packet 2204 is added. The job packet 2201 declares start of attribute rewriting and the job packet 2204 declares termination of the attribute rewriting.

An output restriction information job packet 2202 and an attribute setting job packet 2203 are added between the attribute rewrite start job packet 2201 and the attribute rewrite termination job packet 2204. The output restriction information job packet 2202 includes a body portion capable of setting a reissue restriction ticket and a digital signature for the reissue restriction ticket.

The attribute setting packet 2203, positioned between the output restriction information job packet 2202 and the attribute rewrite termination job packet 2204, can describe a client print job ID, a number of prints, monochrome/color setting, and other job attribute. In FIG. 16, the job packets succeeding the attribute rewrite termination job packet 2204 are identical to the job packets of the original print job illustrated in FIG. 9. The print job, having the arrangement illustrated in FIG. 16, can directly use the data integrity information (i.e., data required for preventing alteration of data) and other data without any modification on the job packets of the original print job.

FIG. 17 illustrates an exemplary arrangement of the attribute rewrite start job packet 2201. In FIG. 17, an ordinate axis represents "Byte" and an abscissa axis represents "Bit" of each byte. The job packet illustrated in FIG. 17 includes a header area in the rows of 0th through 5th bytes. The attribute rewrite start job packet 2201 includes no body portion.

FIG. 18 illustrates an exemplary arrangement of the attribute rewrite termination job packet 2204. In FIG. 18, an ordinate axis represents "Byte" and an abscissa axis represents "Bit" of each byte. The job packet illustrated in FIG. 18 includes a header area in the rows of 0th through 5th bytes and a data area in the row of 6th byte and thereafter. The data area includes an area 2501 ranging from the head of the data area and having a capacity equal to 128 bytes that can store the digital signature. The digital signature can assure that the data has not been rewritten by an unauthorized method.

In the present embodiment, the digital signature is effective for a series of packets ranging from the attribute rewrite start job packet 2201 to the attribute rewrite termination job packet 2204. Alternatively, the digital signature can be effective for all the packets constituting the print job illustrated in FIG. 16.

Figure 19:
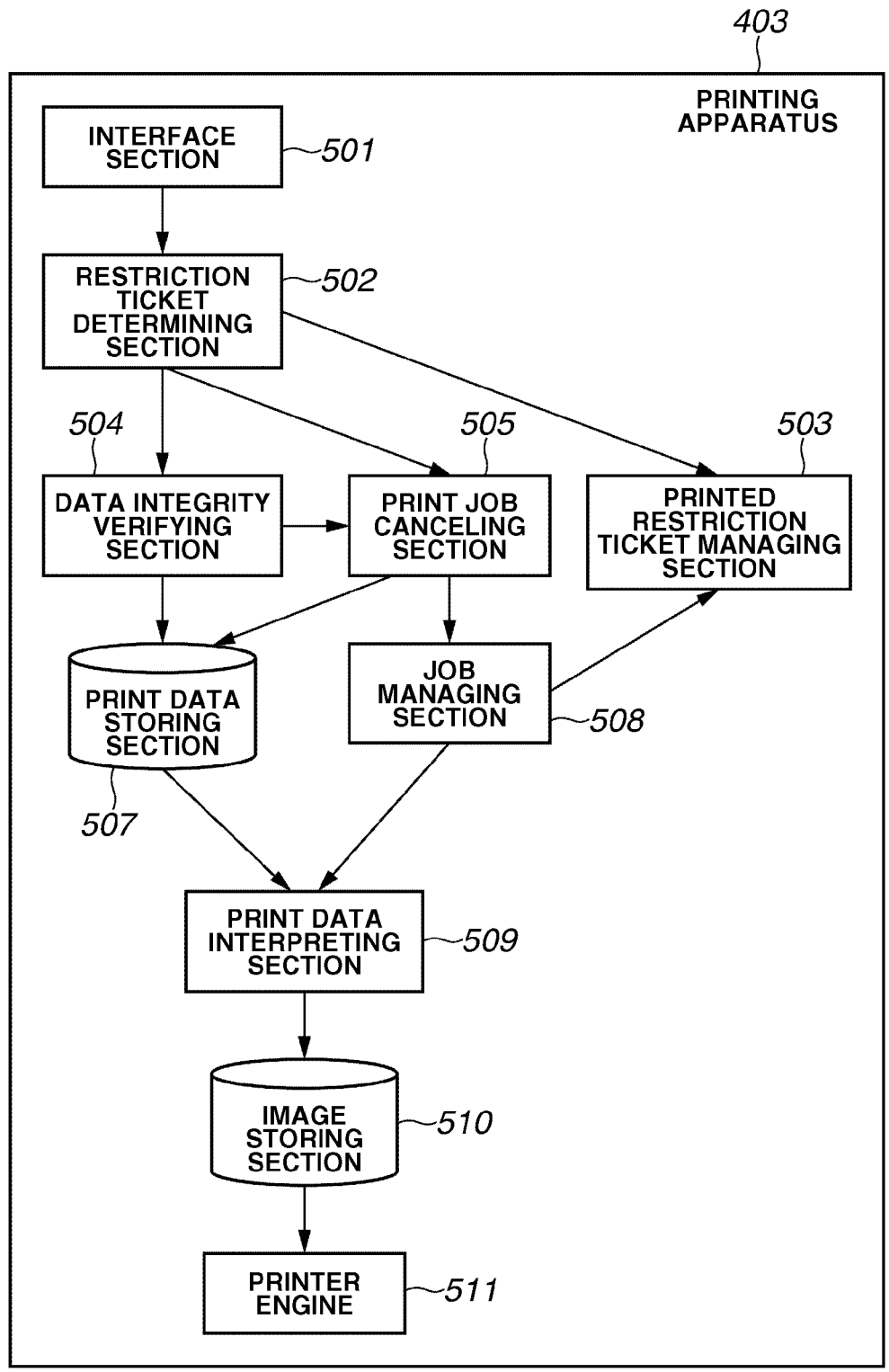
FIG. 19 is a block diagram illustrating functional blocks of a printing apparatus according to an exemplary embodiment of the present invention.

FIG. 19 is a block diagram illustrating exemplary functional blocks of the printing apparatus 403.

In FIG. 19, an interface section 501 is capable of receiving a print job from the print management system 405 via the network 404. A restriction ticket determining section 502 checks the format of the print job received from the interface section 501 and determines whether the print job includes a restriction ticket. A printed restriction ticket managing section 503 stores a digital signature for a restriction ticket of a once-printed print job and a digital signature for a reissue restriction ticket.

A data integrity verifying section 504 verifies data integrity information in the print job. A print job canceling section 505 instructs canceling of a printing operation based on a print job that includes no restriction ticket. A print data storing section 507 temporarily stores print data included in a print job. For example, the print data storing section 507 temporarily stores page description language (PDL) data. A job managing section 508 analyzes a print job and manages the print job. For example, the job managing section 508 manages output attribute information (e.g., color).

Furthermore, the job managing section 508 causes the print data storing section 507 to store PDL data included in a print job. Furthermore, the job managing section 508 manages a print data interpreting section 509 and a printer engine 511 to complete the print processing for the print job. When the print processing is completed, the job managing section 508 causes the printed restriction ticket managing section 503 to store both the digital signature for the restriction ticket of the print job and the digital signature for the reissue restriction ticket.

Referring to the output attribute information of a print job managed by the job managing section 508, the print data interpreting section 509 obtains PDL data from the print data storing section 507 and performs image generation processing to generate image data.

An image storing section 510 temporarily store the image data generated by the print data interpreting section 509 until the print processing is completed. The printer engine 511 prints the image data stored in the image storing section 510 on a print sheet or other medium based on a well-known printing technique (e.g., electro-photographic technique or inkjet technique).

The print data storing section 507 and the image storing section 510 can be the above-described mass-storage hard disk (HD) 1080. However, the print data storing section 507 and the image storing section 510 may have any other physical arrangement. For example, the print data storing section 507 and the image storing section 510 may be a flash memory or other secondary storage apparatus.

Figure 20:
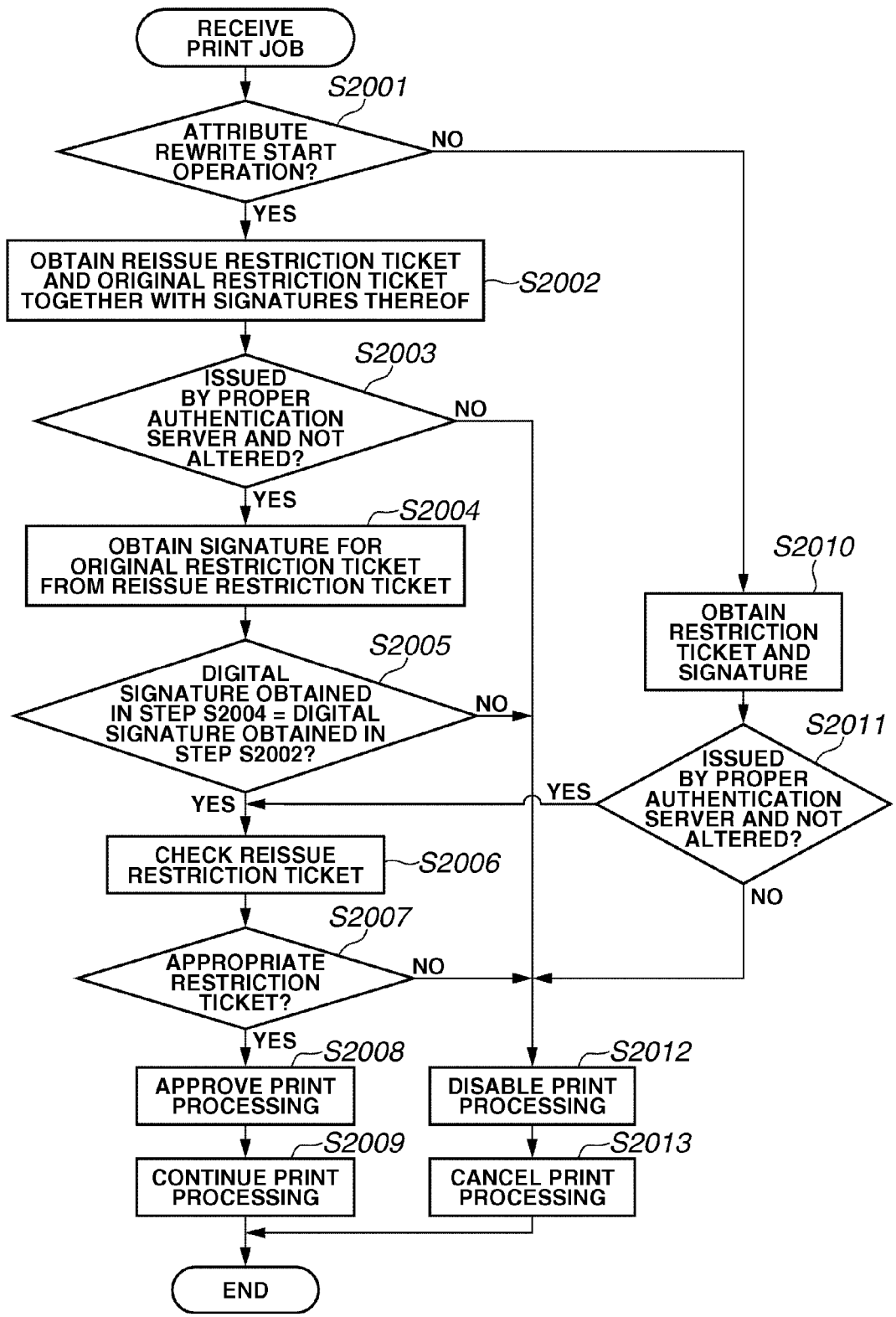
FIG. 20 is a flowchart illustrating an exemplary operation performed by a restriction ticket determining section according to an exemplary embodiment of the present invention.

Next, exemplary print job reception processing will be described. FIG. 20 is a flowchart illustrating an exemplary operation performed by the restriction ticket determining section 502. The restriction ticket determining section 502 starts an operation in response to activation of the printing apparatus 403 and continues the operation until the printing apparatus 403 is deactivated.

First, the restriction ticket determining section 502 receives a job packet of the print job received from the interface section 501 and refers to an operation code of the job packet. Then, in step S2001, the restriction ticket determining section 502 determines whether the operation code is 0x0303 (i.e., determines whether the job packet indicates an attribute rewrite start operation). If the restriction ticket determining section 502 determines that the job packet does not indicate the attribute rewrite start operation (NO in step S2001), the processing flow proceeds to step S2010.

On the other hand, if the job packet indicates the attribute rewrite start operation (YES in step S2001), the processing flow proceeds to step S2002.

In step S2002, the restriction ticket determining section 502 obtains job packets 2202 and 2203 between the attribute rewrite start job packet 2201 (attribute rewrite start operation) and the attribute rewrite termination job packet 2204 (attribute rewrite termination operation).

More specifically, the restriction ticket determining section 502 obtains the output restriction information job packet 2202 describing output restriction information. Then, the restriction ticket determining section 502 obtains a reissue restriction ticket and a digital signature for the reissue restriction ticket from a body portion of the obtained output restriction information job packet 2202.

Furthermore, the restriction ticket determining section 502 obtains an original restriction ticket and a digital signature for the original restriction ticket from the job packet 801 indicating output restriction information (i.e., a job packet succeeding the attribute rewrite termination job packet 2204).

Next, in step S2003, the restriction ticket determining section 502 verifies the original restriction ticket and the digital signature for the original restriction ticket and also verifies the reissue restriction ticket and the digital signature for the reissue restriction ticket.

More specifically, the restriction ticket determining section 502 determines whether the original restriction ticket and the reissue restriction ticket have been issued by the reliable authentication server 102 and have not been altered. If the restriction ticket determining section 502 determines that the conditions of step 2003 are not satisfied, i.e., when the original restriction ticket and the reissue restriction ticket have not been issued by the reliable authentication server 102 or have been altered (NO in step S2003), the processing flow proceeds to step S2012.

On the other hand, if the restriction ticket determining section 502 determines that the conditions of step 2003 are satisfied, i.e., when the original restriction ticket and the reissue restriction ticket have been issued by the reliable authentication server 102 and have not been altered (YES in step S2003), the processing flow proceeds to step S2004. In step S2004, the restriction ticket determining section 502 obtains the digital signature for the original restriction ticket from the reissue restriction ticket (refer to sixth row 1106 in FIG. 15).

Subsequently, in step S2005, the restriction ticket determining section 502 determines whether the digital signature for the reissue restriction ticket obtained in step S2004 agrees with the digital signature for the original restriction ticket in the restriction information packet obtained in step S2002. If the restriction ticket determining section 502 determines that the digital signature for the reissue restriction ticket disagrees with the digital signature for the original restriction ticket in the restriction information packet (NO in step S2005), the processing flow proceeds to step S2012.

On the other hand, if the digital signature for the reissue restriction ticket agrees with the digital signature for the original restriction ticket in the restriction information packet (YES in step S2005), the processing flow proceeds to step S2006. In step S2006, the restriction ticket determining section 502 checks the reissue restriction ticket about the following points (A) through (C).

(A) The restriction ticket determining section 502 determines whether the term of validity for the restriction ticket has expired. More specifically, the restriction ticket determining section 502 obtains the term of validity for the reissue restriction ticket being set in the fourth row 1104 of the reissue restriction ticket and compares the obtained term of validity with the present time. Then, based on a comparison result, the restriction ticket determining section 502 determines the validity for the restriction ticket.

(B) The restriction ticket determining section 502 determines whether the output destination printer information designates the printing apparatus 403. More specifically, the restriction ticket determining section 502 obtains the output destination printer information being set in the third row 1103 of the reissue restriction ticket and determines whether the obtained output destination printer information designates the printing apparatus 403.

(C) The reissue restriction ticket determining section 502 determines whether the restriction ticket is not a printed restriction ticket. More specifically, the restriction ticket determining section 502 determines whether the printed restriction ticket managing section 503 stores a restriction ticket identical to the reissue restriction ticket of the present print job.

In step S2007, the restriction ticket determining section 502 determines whether the term of validity for the reissue restriction ticket has not yet expired, whether the output destination printer information indicates the printing apparatus 403, and whether the reissue restriction ticket is not a printed restriction ticket. If the restriction ticket determining section 502 determines that the conditions of step S2007 are not satisfied (NO in step S2007), the processing flow proceeds to step S2012. Namely, when the term of validity for the reissue restriction ticket has already expired, when the output destination printer information does not indicate the printing apparatus 403, or when the reissue restriction ticket is a printed restriction ticket, the processing flow proceeds to step S2012.

On the other hand, if the restriction ticket determining section 502 determines that the conditions of step S2007 are satisfied and the reissue restriction ticket is appropriate (YES in step S2007), the processing flow proceeds to step S2008. Namely, when the term of validity for the reissue restriction ticket has not yet expired, the output destination printer information indicates the printing apparatus 403, and the reissue restriction ticket is not a printed restriction ticket, the processing flow proceeds to step S2008.

In step S2008, the restriction ticket determining section 502 determines that the print processing based on the print job received through the interface section 501 is approved. In step S2009, the restriction ticket determining section 502 sends a notification of continued print processing to the data integrity verifying section 504. Thus, in step S2009, the printing apparatus 403 performs the print processing based on the restriction content of the reissue restriction ticket and then processing ends.

For example, the printing apparatus 403 performs the print processing based on the reissue output restriction information 2202 and disregards the output restriction information 801 illustrated in FIG. 16. If necessary, the output restriction information 801 can be removed or invalidated. Alternatively, the output restriction information 801 can be rewritten based on the reissue output restriction information 2202 so that the rewritten output restriction information 801 can be used.

In the present embodiment, the reissue restriction ticket is not modified. For example, if the restriction ticket illustrated in FIG. 15 is a reissue restriction ticket, the job is forcibly set to the two-sided printing in step S2009. The print data storing section 507 stores a print command including the two-sided printing being forcibly set based on the reissue restriction ticket.

The print data interpreting section 509 processes the job data. The image storing section 510 stores the processed job data. The printer engine 511 prints image data. The print data interpreting section 509 controls the print processing within the maximum number of prints which is set to 50 sheets. If the job data exceeds the maximum number of prints (e.g., 50), the restriction ticket determining section 502 can cancel the job at step S2007 and notify a user of cancellation of the job.

If the restriction ticket determining section 502 determines that the job packet includes no attribute rewrite start operation (NO in step S2001), the restriction ticket determining section 502 analyzes a job packet describing output restriction information. Then, the restriction ticket determining section 502 obtains a restriction ticket and a digital signature for the restriction ticket (refer to step S2010).

Subsequently, in step S2011, the restriction ticket determining section 502 verifies the obtained restriction ticket and the digital signature for the restriction ticket. More specifically, the restriction ticket determining section 502 determines whether the restriction ticket has been issued by the reliable authentication server 102 and has not been altered.

If the restriction ticket determining section 502 determines that the conditions of step S2011 are satisfied (YES in step S2011), the processing flow proceeds to step S2006. Namely, when the restriction ticket has been issued by the reliable authentication server 102 and has not been altered, the processing flow proceeds to step S2006.

Then, in step S2006, the restriction ticket determining section 502 performs the confirmation processing for the restriction ticket obtained in step S2010. Then, the restriction ticket determining section 502 applies the processing of step S2007 to the restriction ticket.

If the restriction ticket determining section 502 determines that the restriction ticket is authentic (YES in step S2006), the restriction ticket determining section 502 performs the processing of step S2008. Next, the restriction ticket determining section 502 performs the processing of step S2009. In the step S2009, the printing apparatus 403 performs the print processing based on the restriction ticket and then processing ends.

The restriction ticket describes restriction content of a user having issued a job. For example, the restriction ticket may forcibly set two-sided printing. The restriction number of prints may be set to 50. In this case, the print data storing section 507 stores a print command designating the two-sided printing setting being forcibly set based on the restriction ticket. The print data interpreting section 509 processes the job data. The image storing section 510 stores the processed job data. The printer engine 511 prints image data.

The print data interpreting section 509 controls the print processing within the maximum number of prints (e.g., 50 sheets). If the job data exceeds the maximum number of prints (e.g., 50), the restriction ticket determining section 502 can cancel the job at step S2007 and notify a user of cancellation of the job.

On the other hand, if the restriction ticket determining section 502 determines that the conditions of step S2011 are not satisfied (NO in step S2011), the processing flow proceeds to step S2012. Namely, when the restriction ticket has not been issued by the reliable authentication server 102 or when the restriction ticket has been altered, the processing flow proceeds to step S2012.

In step S2012, the restriction ticket determining section 502 determines that the print processing based on the print job received through the interface section 501 is disabled. In step S2013, the restriction ticket determining section 502 sends a notification of canceling the print processing to the print job canceling section 505. Processing then ends.

Figure 21:
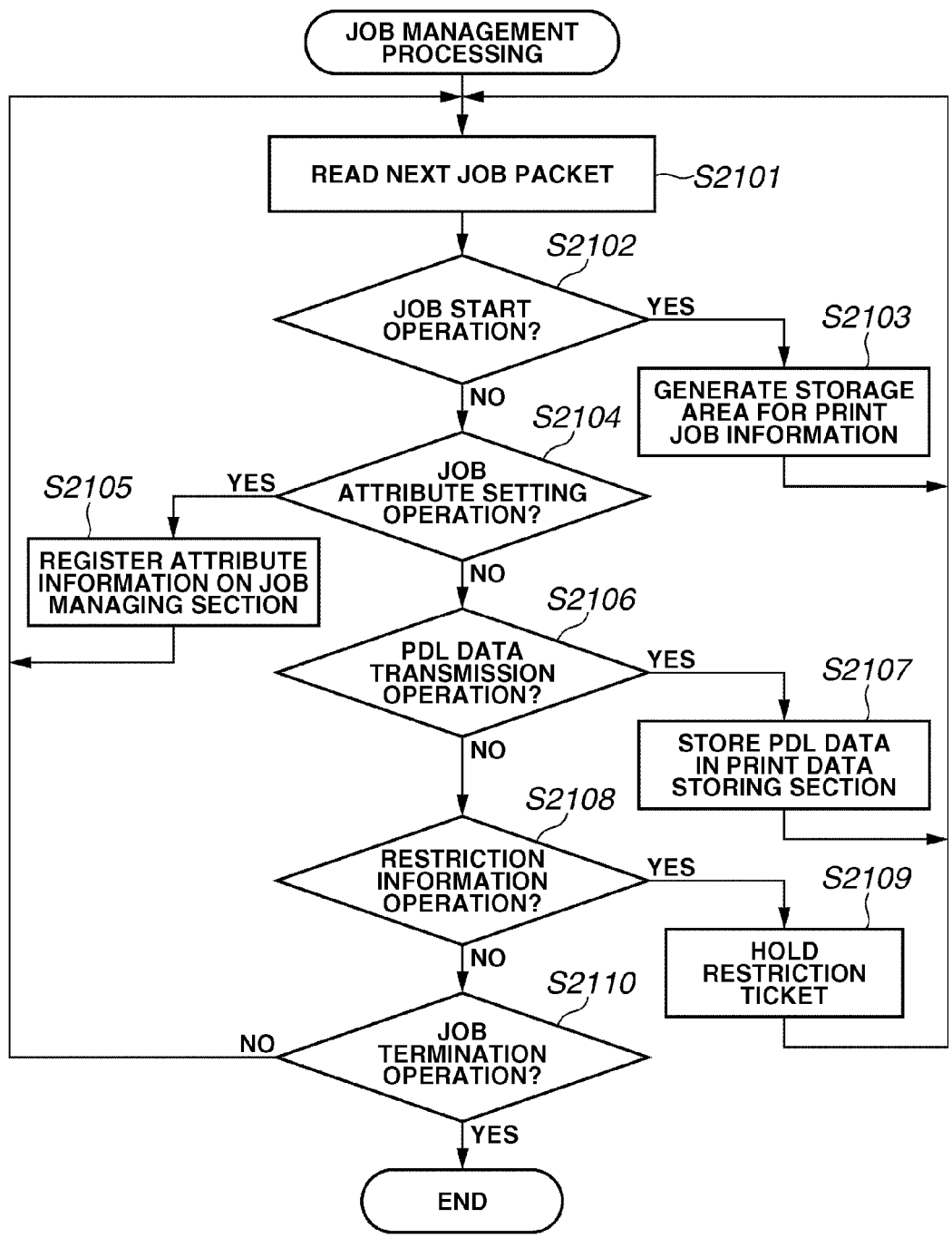
FIG. 21 is a flowchart illustrating an exemplary operation performed by a job managing section according to an exemplary embodiment of the present invention.

FIG. 21 is a flowchart illustrating an exemplary operation performed by the job managing section 508. First, in step S2101, the job managing section 508 successively reads job packets of a print job. Then, in step S2102, the job managing section 508 determines whether the job packet read in step S2101 has an operation code equal to 0x0201 (i.e., determines whether the job packet indicates a job start operation).

If the job managing section 508 determines that the job packet indicates the job start operation (YES in step S2102), the processing proceeds to step S2103. In step S2103, the job managing section 508 generates a storage area in the job managing section 508 that can store print job information. In the following description, the storage area storing the print job information may be referred to as "print job information storage area." Processing then returns to step S2101 to read the next job packet.

On the other hand, if the job managing section 508 determines that the job packet does not indicate the job start operation (NO in step S2102), the processing proceeds to step S2104. In step S2104, the job managing section 508 determines whether the job packet read in step S2101 has an operation code equal to 0x0202 (i.e., determines whether the job packet indicates a job attribute setting operation).

If the job managing section 508 determines that the job packet indicates the job attribute setting operation (YES in step S2104), the processing proceeds to step S2105. In step S2105, the job managing section 508 registers attribute information on the print job information storage area generated in step S2103. Processing then returns to step S2101 to read the next job packet.

On the other hand, if the job packet does not indicate the job attribute setting operation (NO in step S2104), the processing proceeds to step S2106. In step S2106, the job managing section 508 determines whether the job packet read in step S2101 has an operation code equal to 0x0204 (i.e., determines whether the job packet indicates a PDL data transmission operation).

If the job managing section 508 determines that the job packet indicates the PDL data transmission operation (YES in step S2106), the processing proceeds to step S2107. In step S2107, the job managing section 508 causes the print data storing section 507 to store the PDL data. Processing then returns to step S2101 to read the next job packet.

On the other hand, if the job packet does not indicate the PDL data transmission operation (NO in step S2106), the processing proceeds to step S2108. In step S2108, the job managing section 508 determines whether the job packet read in step S2101 has an operation code equal to 0x0301 (i.e., determines whether the job packet indicates a restriction information operation).

If the job managing section 508 determines that the job packet indicates the restriction information operation (YES in step S2108), the processing proceeds to step S2109. In step S2109, the job managing section 508 stores the restriction ticket or the reissue restriction ticket in the print job information storage area generated in step S2103. In this case, if the reissue restriction ticket is already stored in the print job information storage area, the job managing section 508 does not store the restriction ticket. Processing then returns to step S2101 to read the next job packet.

On the other hand, if the job packet does not indicate the restriction information operation (NO in step S2106), the processing flow proceeds to step S2110. In step S2110, the job managing section 508 determines whether the job packet read in step S2101 has an operation code equal to 0x0205 (i.e., determines whether the job packet indicates a job termination operation). If the job packet indicates the job termination operation (YES in step S2110), the job managing section 508 terminates the processing of this routine. On the other hand, if the job packet does not indicate the job termination operation (NO in step S2110), the processing flow returns to step S2101.

Figure 22:
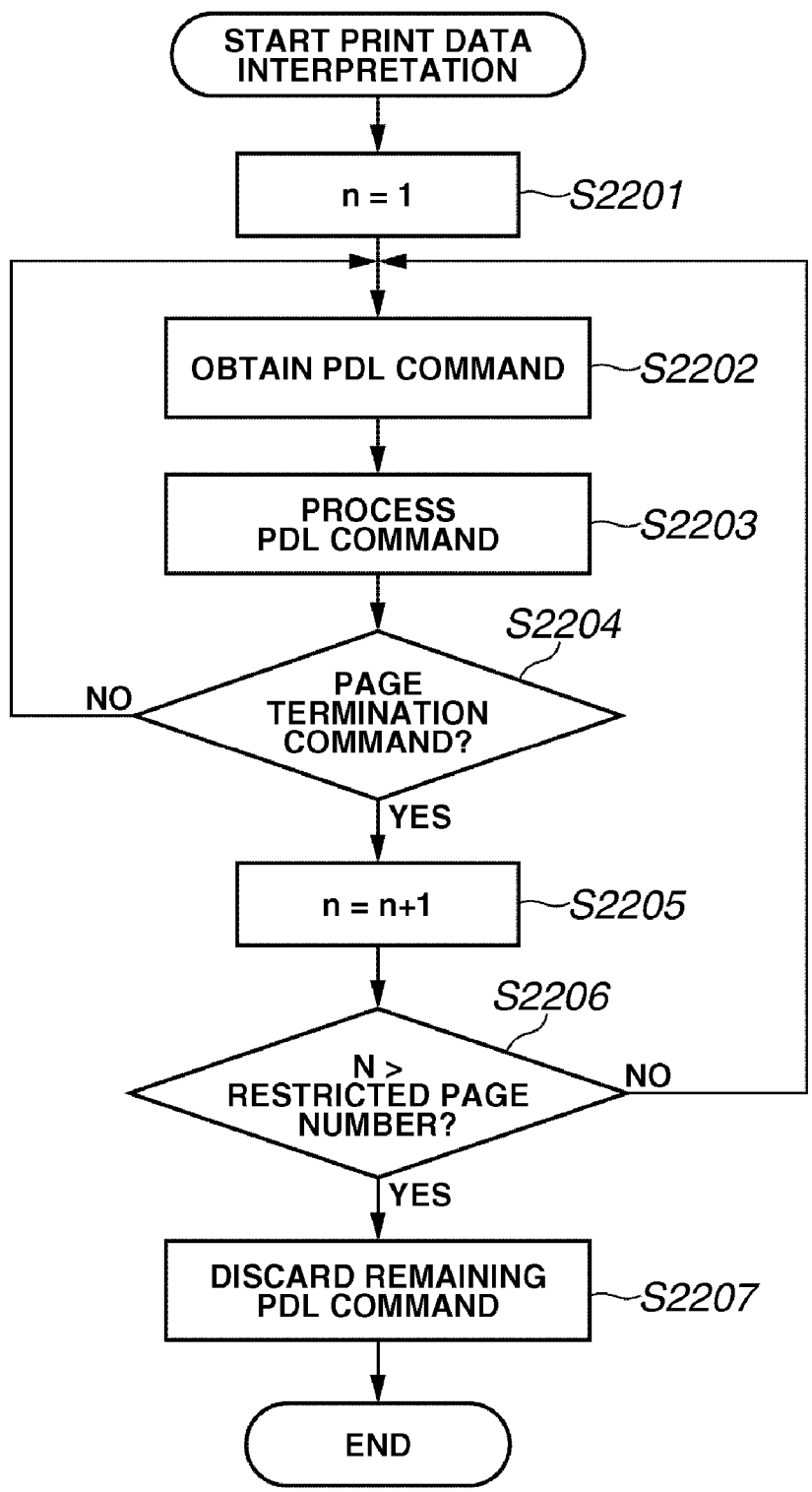
FIG. 22 is a flowchart illustrating an exemplary operation performed by a print data interpreting section based on output restriction information according to an exemplary embodiment of the present invention.

FIG. 22 is a flowchart illustrating an exemplary operation performed by the print data interpreting section 509 based on output restriction information. The print data interpreting section 509 can interpret PDL language and generate image data used for actual printing. For example, the PDL standard includes various standards including postscript or LIPS. The print data interpreting section 509 receives a print job and continues the processing until interpretation for a final page of a received print job is completed.

First, in step S2201, the print data interpreting section 509 initializes a variable "n" to 1. The variable "n" represents a page number. Then, in step S2202, the print data interpreting section 509 obtains a PDL command from the print data storing section 507. Next, in step S2203, the print data interpreting section 509 performs interpretation processing for the obtained PDL command. In the present embodiment, the PDL command includes a "rectangular drawing" command and an "image drawing" command, for example, in the LIPS language.

In step S2204, the print data interpreting section 509 determines whether the PDL command processed in step S2203 is a page termination command. If the print data interpreting section 509 determines that the PDL command processed in step S2203 is not a page termination command (NO in step S2204), the print data interpreting section 509 repeatedly performs the processing of steps S2202 through S2204. If the PDL command processed in step S2203 becomes a page termination command (YES in step S2204), the processing flow proceeds to step S2205. In step S2205, the print data interpreting section 509 increments the variable "n" by adding 1.

Next, in step S2206, the print data interpreting section 509 determines whether the variable "n" (i.e., page number) is greater than a restricted page number based on the restriction ticket being set in step S2109 of FIG. 21. If the print data interpreting section 509 determines that the variable "n" is not greater than the restricted page number (NO in step S2206), the print data interpreting section 509 repeatedly performs the processing of steps S2202 through S2206.

If the variable "n" is greater than the restricted page number (YES in step S2206), the processing flow proceeds to step S2207. In step S2207, the print data interpreting section 509 discards the remaining PDL command and processing then ends. According to the exemplary restriction ticket illustrated in FIG. 10, the maximum number of prints is set to 100. Therefore, when the page termination command for the PDL data is detected 100 times, the print data interpreting section 509 skips the remaining PDL data. The printing apparatus 403 does not print the skipped PDL data.

Figure 23:
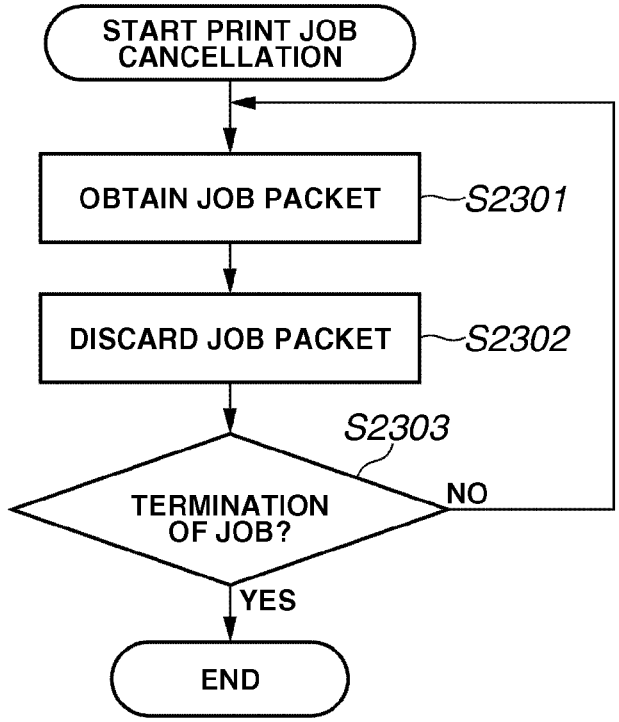
FIG. 23 is a flowchart illustrating an exemplary operation performed by a print job canceling section according to an exemplary embodiment of the present invention.

The following is exemplary processing for a print job including no restriction ticket. FIG. 23 is a flowchart illustrating an exemplary operation performed by the print job canceling section 505. The print job canceling section 505 starts an operation in response to activation of the printing apparatus 403 and continues the operation until the printing apparatus 403 is deactivated.

When the restriction ticket determining section 502 determines that a print job includes no output restriction information, the print job canceling section 505 obtains a job packet of this print job (refer to step S2301). Next, in step S2302, the print job canceling section 505 discards the obtained job packet. Then, in step S2303, the print job canceling section 505 determines whether the print job has terminated.

If the print job canceling section 505 determines that the print job has not terminated yet (NO in step S2303), the print job canceling section 505 repeatedly performs the processing of steps S2301 through S2303. On the other hand, if the print job has terminated (YES in step S2303), the print job canceling section 505 terminates the processing of this routine and waits for an acquirement of a new print job.

As described above, according to the present embodiment, the authentication server 402 issues a restriction ticket based on a request of the host computer 401. The restriction ticket describes a term of validity for the restriction ticket (refer to the fourth row 904 in FIG. 10) as well as a term of reissue (refer to the fifth row 905 in FIG. 10).

The host computer 401 generates a secure print job including a restriction ticket, and transmits the generated secure print job to the print management system 405. If a print job added to the secure print job is not an ordinary printing, or if the restriction ticket of the secure print job has an expired term of validity (refer to the fourth row 904 in FIG. 10), the print management system 405 requests the authentication server 402 to reissue a restriction ticket.

Then, the authentication server 402 determines whether the above-described four conditions (i) through (iv) (e.g., the term of reissue for the original restriction ticket is unexpired) are satisfied. If all the conditions (i) through (iv) are satisfied, the authentication server 402 generates a reissue restriction ticket based on the original restriction ticket and sends the reissue restriction ticket to the print management system 405.

The print management system 405 generates a print job including an attribute rewrite command (job packets 2201, 2202, and 2204) and the reissue restriction ticket (job packet 2203). The attribute rewrite command indicates that the original restriction ticket can be replaced by the reissue restriction ticket. The printing apparatus 403 executes the print processing based on the print job only when the reissue restriction ticket added to the print job satisfies predetermined conditions (e.g., the reissue restriction ticket is based on the original restriction ticket).

According to the above-described exemplary embodiment, the print management system 405 is not required to hold user authentication information because the print management system 405 can request the authentication server 402 to update a restriction ticket and can receive the updated restriction ticket from the authentication server 402.

Accordingly, the system including the print management system 405, capable of managing print processing based on a print job, can realize printing for a restriction ticket having expired validity or can change the attribute or output destination of a print job while maintaining an anti-alteration function or a replay attack prevention function.

Therefore, the system according to the present embodiment can flexibly and appropriately restrict an output of a print job. For example, the print processing performed by the print 405 includes reservation printing, substitute printing, and distributed printing.

In the present embodiment, the printing apparatus 403 is not limited to the multifunction peripheral (MFP) and can be any other printer. The network 404 is not limited to the local area network (LAN) and can be, for example, the Internet.

In the above-described embodiment, the print management system 405 has a function of requesting a reissue of the restriction ticket. However, the printing apparatus 403 can request reissue of a restriction ticket. Furthermore, in the present embodiment, the data integrity information is not added to the attribute rewrite command (i.e., the attribute rewrite start job packet 2201, the output restriction information job packet 2202, the attribute setting job packet 2203, and the attribute rewrite termination job packet 2204).

However, the data integrity information can be added to the attribute rewrite command. Furthermore, the data integrity information can be added to the entire job including the original print job. Moreover, if the restriction ticket is re-reissued, a portion added in a re-reissue of the restriction ticket can be replaced with a portion added in a reissue of the restriction ticket.

Additionally, in the present embodiment, the conditions for a reissue of the restriction ticket are not limited to the above-described embodiment. For example, when the print management system 405 requests a reissue of the restriction ticket, the authentication server 402 determines whether the printing apparatus 403 (i.e., output destination of a print job) holds a restriction ticket. The authentication server 402 reissues a restriction ticket only when the printing apparatus 403 holds no restriction ticket. For example, the authentication server 402 can inquire the printing apparatus 403 about the presence of a restriction ticket. Alternatively, the printing apparatus 403 can spontaneously inform the authentication server 402 of the presence of a restriction ticket.

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments.

In this case, the program code itself can realize the functions of the exemplary embodiments. The equivalents of programs can be used if they possess comparable functions. Furthermore, program code may be supplied to a computer with a storage (or recording) medium storing the program code. In this case, the type of program can be any one of object code, interpreter program, and OS script data. A storage medium supplying the program can be selected from any one of a flexible (floppy) disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. The present invention encompasses WWW servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users. Only authorized users are allowed to download key information from a web site on the Internet and decipher the programs with the obtained key information to install the programs on their computers. When the computer reads and executes the installed programs, the functions of the above-described exemplary embodiments can be realized.

Moreover, an operating system (OS) or other application software running on the computer can execute part or all of the actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-150366 filed May 30, 2006, which is hereby incorporated by reference herein in its entirety.

What is claimed is:

1. A print control data generating apparatus comprising:
a first print control data generation unit configured to generate first print control data that includes print control data capable of controlling an output of a print job, includes a term of validity for the print control data, and includes a term of reissue for the first print control data, wherein the term of reissue is longer than the term of validity;
a first print control data outputting unit configured to output the first print control data generated by the first print control data generation unit;
a determination unit configured to determine whether the term of validity for the first print control data is unexpired;
a reissue determination unit configured to determine whether the first print control data can be reissued in response to a reissue request of the generated first print control data;
a second print control data generation unit configured to generate second print control data based on the first print control data, when the determination unit determines that the term of validity for the first print control data has expired, if a reissue of the first print control data output by the first print control data outputting unit is requested and when the reissue determination unit determines that the first print control data can be reissued based on the term of reissue included in the first print control data; and
a second print control data outputting unit configured to output the second print control data generated by the second print control data generation unit,
wherein the second print control data generation unit sets a new term of validity from a current time,
wherein a print job to be printed by a printing apparatus includes the second print control data reissued based on the first print control data, and
wherein the second print control data is not reissued based on the first print control data, when the term of reissue included in the first print control data has elapsed and the reissue determination unit determines that the first print control data cannot be reissued.

2. The print control data generating apparatus according to claim 1, further comprising a signature information determining unit configured to receive signature information for the first print control data generated from the first print control data outputting unit and determine whether the received signature information is authentic, wherein the reissue determination unit determines that the first print control data cannot be reissued if the signature information determining unit determines that the signature information is not authentic.

3. The print control data generating apparatus according to claim 1, wherein the reissue determination unit determines that the second print control data cannot be reissued if a certificate for a request source that requests the reissue of the first print control data is not stored in a storage medium.

4. The print control data generating apparatus according to claim 1, wherein the reissue determination unit determines that the second print control data cannot be reissued if a user of the first print control data is not present.

5. The print control data generating apparatus according to claim 1, wherein the reissue determination unit includes a second reissue determination unit configured to determine that the second print control data can be reissued if the first print control data is not stored in a printing apparatus that can function as an output destination of the print job.

6. The print control data generating apparatus according to claim 1, wherein the first print control data generation unit generates the first print control data including first output destination information relating to an output destination of the print job, and the second print control data generation unit generates the second print control data including second output destination information relating to an output destination of the print job, wherein the second output destination information is set based on information obtained from the request source that requests the reissue of the first print control data.

7. The print control data generating apparatus according to claim 6, further comprising an output destination determining unit configured to determine whether the print job has plural output destinations based on the information obtained from the request source that requests the reissue of the first print control data, wherein the second print control data generation unit generates plural second print control data corresponding to the number of the output destinations if the output destination determining unit determines that the print job has plural output destinations.

8. A printing apparatus comprising:
an inputting unit configured to input a print job;
a determination unit configured to determine whether a print control based on second print control data is feasible if the print job includes first print control data and the second print control data, the first print control data restricting an output of the print job;
a printing unit configured to perform a print operation of the print job based on information included in the second print control data if the determination unit determines that the print control based on the second print control data is feasible; and
a print canceling unit configured to cancel the print operation of the print job if the determination unit determines that the print control based on the second print control data is not feasible, wherein the second print control data is reissued based on the first print control data that the term for validity for the first print control data has expired and that a reissue has been requested within a term of reissue for the first print control data, wherein the term of reissue is longer than the term of validity for the first print control data,
wherein the second print control data includes a term of validity for the second print control data, and the print canceling unit cancels the print operation of the print job if the term of validity for the second print control data has expired,
wherein, if the print job includes the second print control data and does not include the valid first print control data, the print canceling unit cancels the print operation of the print job, and
wherein the second print control data is not reissued based on the first print control data, when the term of reissue has elapsed.

9. The printing apparatus according to claim 8, further comprising an alteration determining unit configured to determine whether the print job is altered, wherein the print canceling unit cancels the print operation of the print job if the alteration determining unit determines that the print job is altered.

10. The printing apparatus according to claim 9, wherein the print job includes anti-alteration information that prevents the print job from being altered, and the alteration determining unit determines alteration of the print job based on the anti-alteration information.

11. The printing apparatus according to claim 10, wherein the anti-alteration information includes at least one of first anti-alteration information and second anti-alteration information, wherein the first anti-alteration information is included in an area different from areas for the first print control data and the second print control data and the second anti-alteration information is included in the second print control data.

12. The printing apparatus according to claim 8, wherein the printing unit performs a printing operation of the print job based on information included in the first print control data if the print job includes the first print control data and does not include the second print control data.

13. The printing apparatus according to claim 8, wherein the second print control data includes output destination information relating to an output destination of the second print control data, and the print canceling unit cancels the print operation of the print job if the output destination information included in the second print control data does not indicate a printing apparatus being set beforehand.

14. A method comprising:
generating, using a processor, first print control data that includes print control data capable of controlling an output of a print job, includes a term of validity for the print control data, and includes a term of reissue for the first print control data, wherein the term of reissue is longer than the term of validity;
outputting the generated first print control data;
determining whether the term of validity for the first print control data is unexpired;
determining whether the first print control data can be reissued in response to a reissue request of the generated first print control data;
generating second print control data based on the first print control data, when the determining determines that the term of validity for the first print control data has expired, if a reissue of the output first print control data is requested and when determining determines that the first print control data can be reissued based on the term of reissue included in the first print control data; and
outputting the generated second print control data,
wherein generating sets a new term of validity from a current time,
wherein a print job to be printed by a printing apparatus includes the second print control data reissued based on the first print control data, and
wherein the second print control data is not reissued based on the first print control data, when the term of reissue included in the first print control data has elapsed and the determining determines that the first print control data cannot be reissued.

15. A method comprising:
inputting a print job having first print control data including print control data that restricts an output of the print job and includes a term of reissue for the first print control data, the term of reissue being longer than a term of validity for the print control data;
requesting a reissue of print control data corresponding to the first print control data included in the print job;
determining whether the first print control data can be reissued in response to a reissue request of the first print control data included in the print job;
inputting second print control data generated in response to the requested reissue when the determining determines that the first print control data can be reissued based on the term of reissue included in the first print control data;
adding, using a processor, attribute change command information and the second print control data to the print job when the second print control data is input, so that the first print control data can be replaced with the second print control data based on the attribute change command information; and
outputting a print job including the attribute change command information and the second print control data, wherein the second print control data is reissued based on the first print control data, the term for validity of which has expired,
wherein the second print control data includes a term of validity for the second print control data, and the print canceling unit cancels the print operation of the print job if the term of validity for the second print control data has expired,
wherein, if the print job includes the second print control data and does not include the valid first print control data, the print canceling unit cancels the print operation of the print job, and
wherein the second print control data is not reissued based on the first print control data, when the term of reissue included in the first print control data has elapsed and the determining determines that the first print control data cannot be reissued.

16. A method comprising:
inputting a print job;
determining, using a processor, whether a print control based on second print control data is feasible if the print job includes first print control data and the second print control data, the first print control data restricting an output of the print job;
performing a print operation of the print job based on information included in the second print control data if the determining determines that the print control based on the second print control data is feasible; and
canceling the print operation of the print job if the determining determines that the print control based on the second print control data is not feasible, wherein the second print control data is reissued based on the first print control data that the term for validity for the first print control data has expired and that a reissue has been requested within a term of reissue for the first print control data, wherein the term of reissue is longer than the term of validity for the first print control data,
wherein the second print control data includes a term of validity for the second print control data, and the canceling cancels the print operation of the print job if the term of validity for the second print control data has expired,
wherein, if the print job includes the second print control data and does not include the valid first print control data, the canceling cancels the print operation of the print job, and
wherein the second print control data is not reissued based on the first print control data, when the term of reissue has elapsed.

17. A non-transitory computer-readable storage medium storing a program that causes a print control data generating apparatus to perform the method according to claim 14.

18. A non-transitory computer-readable storage medium storing a program that causes a processor to perform the method according to claim 15.

19. A non-transitory computer-readable storage medium storing a program that causes a printing apparatus to perform the method according to claim 16.

* * * * *